(12) United States Patent
Onomura et al.

(10) Patent No.: US 8,747,265 B2
(45) Date of Patent: Jun. 10, 2014

(54) POWER TRANSMITTING DEVICE FOR HYBRID VEHICLE

(75) Inventors: Yasuhiro Onomura, Saitama (JP); Shinji Fujimoto, Saitama (JP); Jiro Obinata, Saitama (JP); Taku Yatsugi, Saitama (JP); Katsumi Kubo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 306 days.

(21) Appl. No.: 13/254,432

(22) PCT Filed: Mar. 1, 2010

(86) PCT No.: PCT/JP2010/053210
§ 371 (c)(1),
(2), (4) Date: Sep. 1, 2011

(87) PCT Pub. No.: WO2010/116818
PCT Pub. Date: Oct. 14, 2010

(65) Prior Publication Data
US 2012/0053011 A1 Mar. 1, 2012

(30) Foreign Application Priority Data
Mar. 30, 2009 (JP) ................ 2009-082177

(51) Int. Cl.
*F16H 3/72* (2006.01)
*F16H 37/06* (2006.01)

(52) U.S. Cl.
USPC .............................. 475/5; 475/343

(58) Field of Classification Search
USPC ................. 475/5; 74/330
See application file for complete search history.

(56) References Cited

U.S. PATENT DOCUMENTS

| 6,159,127 | A | 12/2000 | Loeffler et al. |
|---|---|---|---|
| 7,364,523 | B2 * | 4/2008 | Heitmann et al. .............. 475/5 |
| 7,448,975 | B2 * | 11/2008 | Reisch et al. ................... 475/5 |
| 2002/0065168 | A1 | 5/2002 | Kima |
| 2003/0045389 | A1 | 3/2003 | Kima |
| 2006/0025260 | A1 * | 2/2006 | Klemen et al. ................. 475/5 |
| 2009/0011887 | A1 | 1/2009 | Komada et al. |
| 2009/0120701 | A1 * | 5/2009 | Taguchi et al. .......... 180/65.285 |
| 2011/0162483 | A1 * | 7/2011 | Jackson .................... 74/665 A |

FOREIGN PATENT DOCUMENTS

| EP | 2 161 154 A1 | 3/2010 |
|---|---|---|
| JP | 2002-503183 A | 1/2002 |
| JP | 2002-114063 A | 4/2002 |
| JP | 2002-165304 A | 6/2002 |

(Continued)

*Primary Examiner* — Justin Holmes
*Assistant Examiner* — Stacey Fluhart
(74) *Attorney, Agent, or Firm* — Arent Fox LLP

(57) ABSTRACT

A power transmitting device having a main input shaft selectively connected to an output shaft of an engine by a main clutch CM; first and second sub input shafts disposed coaxially and selectively connected to the main input shaft by clutches C1 and C2, respectively; an output shaft connected to the first and second sub input shafts via a pair of gears, respectively, and outputting motive power to driving wheels via a counter shaft; and a deceleration mechanism configured to be capable of differentially rotating a sun gear, which is connected to the main input shaft and an electric motor, a ring gear, and a carrier, which is connected to the first sub input shaft, with respect to one another and transmitting the motive power to the output shaft via the carrier. A brake B capable of locking the ring gear is connected to the ring gear.

20 Claims, 34 Drawing Sheets

(56) References Cited

FOREIGN PATENT DOCUMENTS

| | | |
|---|---|---|
| JP | 2003-72403 A | 3/2003 |
| JP | 2004-182034 A | 7/2004 |
| JP | 2007-290677 A | 11/2008 |
| WO | WO 99/50572 A1 | 10/1999 |
| WO | WO 2007/142129 A1 | 12/2007 |
| WO | WO 2008/156193 A1 | 12/2008 |
| WO | WO 2008/156197 A1 | 12/2008 |

* cited by examiner

| CM | ON |
| C1 | OFF |
| C2 | OFF |
| B | ROCK |
| SR | RIGHT |

| CM | ON |
|---|---|
| C1 | ON |
| C2 | OFF |
| B | OPEN |
| SR | NEUTRAL |

| CM | OFF |
|---|---|
| C1 | ON |
| C2 | OFF |
| B | OPEN |
| SR | NEUTRAL |

| CM | ON |
| --- | --- |
| C1 | ON |
| C2 | OFF |
| B | OPEN |
| SR | NEUTRAL |

| CM | ON |
| --- | --- |
| C1 | OFF |
| C2 | ON |
| B | OPEN |
| SR | NEUTRAL |

| CM | OFF |
|---|---|
| C1 | OFF |
| C2 | ON |
| B | OPEN |
| SR | NEUTRAL |

| CM | ON |
| C1 | OFF |
| C2 | ON |
| B | OPEN |
| SR | NEUTRAL |

| CM | ON |
| C1 | OFF |
| C2 | OFF |
| B | ROCK |
| SR | LEFT |

| CM | OFF |
|----|-----|
| C1 | OFF |
| C2 | OFF |
| B | ROCK |
| SR | LEFT |

| CM | ON |
| --- | --- |
| CP | OFF |
| CR | ON |
| C1 | ON |
| C2 | OFF |
| SDR | LEFT |

| CM | OFF |
| --- | --- |
| CP | OFF |
| CR | ON |
| C1 | ON |
| C2 | OFF |
| SDR | LEFT |

| CM | OFF |
| --- | --- |
| CP | OFF |
| CR | ON |
| C1 | OFF |
| C2 | ON |
| SDR | LEFT |

| CM | ON |
|---|---|
| CP | OFF |
| CR | ON |
| C1 | OFF |
| C2 | ON |
| SDR | LEFT |

| CM | ON |
| CP | ON |
| CR | OFF |
| C1 | ON |
| C2 | OFF |
| SDR | LEFT |

| CM | OFF |
| --- | --- |
| CP | ON |
| CR | OFF |
| C1 | ON |
| C2 | OFF |
| SDR | LEFT |

| CM | OFF |
| --- | --- |
| CP | ON |
| CR | OFF |
| C1 | OFF |
| C2 | ON |
| SDR | LEFT |

| CM | OFF |
| --- | --- |
| CP | OFF |
| CR | ON |
| C1 | OFF |
| C2 | OFF |
| SDR | RIGHT |

POWER TRANSMITTING DEVICE FOR HYBRID VEHICLE

CROSS-REFERENCE TO RELATED APPLICATION

This Application is a National Stage entry of International Application No. PCT/JP2010/053210, having an international filing date of Mar. 1, 2010; which claims priority to Japanese Application No. 2009-082177, filed Mar. 30, 2009, the disclosure of each of which is hereby incorporated in its entirety by reference.

TECHNICAL FIELD

The present invention relates to a power transmitting device for a hybrid vehicle including an internal combustion engine and an electric motor.

BACKGROUND ART

There is a power transmitting device for a hybrid vehicle that is capable of combining the output of an internal combustion engine with the output of an electric motor and transmitting the combined output to driving wheels and capable of performing a regenerative operation in the electric motor by distributing the output of the internal combustion engine. As this type of approach, there has been conventionally known a method of outputting motive power input from the output of the internal combustion engine from an output shaft, which is selectively connected to a plurality of shafts and is parallel to an output shaft of the internal combustion engine, via the plurality of shafts disposed coaxially with the output shaft of the internal combustion engine. For example, a power transmitting device described in Patent Document 1 has three shafts disposed coaxially with an output shaft of an internal combustion engine. One of the shafts (hereinafter, referred to as "first shaft") is connected to the internal combustion engine at an end via a clutch. Another shaft (hereinafter, referred to as "second shaft") is connected to the output shaft via a pair of gears and connected to an electric motor at an end. Further, still another shaft (hereinafter, referred to as "third shaft") is selectively connected to the output shaft via a plurality of pairs of gears. In addition, the power transmitting device is provided with a synchronizer that selectively connects the second shaft or the third shaft to the first shaft.

PRIOR ART DOCUMENT

Patent Document

Patent Document 1: Japanese Patent Application Laid-Open No. 2002-114063

SUMMARY OF THE INVENTION

Problems to be Solved by the Invention

The power transmitting device described in Patent Document 1, however, has a disadvantage of inferior transmission efficiency since the power transmitting device needs to cause the synchronizer to operate so as to connect the second shaft to the first shaft in order to combine the motive power of the internal combustion engine with the motive power of the electric motor and to transmit the combined motive power to the output shaft.

In view of the above background, the present invention has been made. Therefore, it is an object of the present invention to provide a power transmitting device for a hybrid vehicle, which includes an internal combustion engine and an electric motor, the power transmitting device being capable of transmitting the motive power of the internal combustion engine and the motive power of the electric motor to a driven unit at high efficiency.

Means for Solving the Problems

The present invention is a power transmitting device for a hybrid vehicle having an internal combustion engine and an electric motor, the power transmitting device comprising: an internal combustion engine output shaft to which motive power is input from the internal combustion engine; a first main input shaft, which is disposed parallel to the internal combustion engine output shaft and selectively connected to the internal combustion engine output shaft by a main make-and-break device; a first sub input shaft, which is disposed coaxially with the first main input shaft and selectively connected to the first main input shaft by a first make-and-break device; a second sub input shaft, which is disposed coaxially with the first main input shaft and selectively connected to the first main input shaft by a second make-and-break device; an output shaft, which is disposed parallel to the first main input shaft and connected to the first sub input shaft and the second sub input shaft, in each case via a pair of gears, and outputs motive power to a driven unit via a counter shaft; and a deceleration mechanism configured so as to be capable of rotating a first rotating element, a second rotating element, and a third rotating element differentially with respect to one another, wherein: the first rotating element is connected to the first main input shaft and the electric motor; the second rotating element is connected to the first sub input shaft; the third rotating element is connected to a lock mechanism, which is capable of locking the third rotating element; and the second rotating element decelerates motive power transmitted from the first rotating element and motive power transmitted from the third rotating element and transmits the motive powers to the output shaft via the first sub input shaft (First aspect of the invention).

According to the first aspect of the invention, the deceleration mechanism, which is configured so as to be capable of rotating the first rotating element, the second rotating element, and the third rotating element differentially with respect to one another, decelerates and outputs the motive power from the output shaft to the driven unit via the first sub input shaft from the second rotating element upon the input of the motive power transmitted from the first rotating element connected to the internal combustion engine and the electric motor and the motive power transmitted from the second rotating element connected to the internal combustion engine via the first sub input shaft. Therefore, the power transmitting device is able to transmit motive power to the driven unit at high efficiency in comparison with the case of transmitting the motive power of the internal combustion engine and the motive power of the electric motor via a synchronizer as in the power transmitting device described in Patent Document 1.

Further, with the first main input shaft connected to the internal combustion engine output shaft by the main make-and-break device, the first sub input shaft connected to the first main input shaft by the first make-and-break device, and the third rotating element locked by the lock mechanism, it is also possible to decelerate the motive power transmitted from the internal combustion engine and the electric motor to the first rotating element and to transmit the motive power to the driven unit via the second rotating element. Moreover, the vehicle is able to run while the electric motor performs the regenerative operation.

Further, in the first aspect of the invention, preferably the first make-and-break device and the second make-and-break device are wet clutches, which are disposed adjacent to each other in the central axis direction in the first main input shaft.

In this case, the first make-and-break device and the second make-and-break device share the joint surface thereof, which enables the power transmitting device to be reduced in size. Moreover, the first make-and-break device and the second make-and-break device share the drive source, which enables the power transmitting device to be reduced in size and achieves a decrease in cost. Further, the power transmitting device is capable of switching between the connection and the disconnection of the first main input shaft and the first sub input shaft or the second sub input shaft without interrupting the power transmission. This enables the switching to be performed quickly between the first make-and-break device and the second make-and-break device without interruption.

Further, in the first aspect of the invention, preferably the power transmitting device further includes: a second main input shaft, which is disposed parallel to the first main input shaft and always connected to the first main input shaft; a third sub input shaft, which is disposed coaxially with the second main input shaft and selectively connected to the second main input shaft by a third make-and-break device; and a fourth sub input shaft, which is disposed coaxially with the second main input shaft and selectively connected to the second main input shaft by a fourth make-and-break device, and a plurality of gears, which are fixed to the output shaft, mesh with gears, which are fixed to the third sub input shaft and the fourth sub input shaft, respectively.

In this case, the variable speed stages are able to be increased while suppressing the length of the power transmitting device in the axial center direction of the first main input shaft.

Moreover, in the first aspect of the invention, preferably the power transmitting device further includes: an input transmission shaft, which is disposed parallel to the first main input shaft and always connected to the first main input shaft; and a reverse gear, which is selectively connected to the input transmission shaft by a synchronizer, and the reverse gear meshes with the gears, which are fixed to the output shaft.

In this case, a backward stage is able to be provided while downsizing the power transmitting device in the direction of the first main input shaft.

Moreover, in the first aspect of the invention, preferably the power transmitting device further includes a reverse gear, which is selectively connected to the first sub input shaft by a synchronizer, and the reverse gear meshes with the gears, which are fixed to the output shaft.

In this case, a backward stage is able to be provided while downsizing the power transmitting device in the direction perpendicular to the first main input shaft.

Further, in the first aspect of the invention, preferably an auxiliary device is connected to the first main input shaft and the auxiliary device is configured so as to be drivable by a driving force of the first main input shaft.

In this case, as long as one of the internal combustion engine or the electric motor runs, the auxiliary device is able to be always driven via the first main input shaft.

Further, in the first aspect of the invention, preferably the deceleration mechanism is a planetary gear unit coaxially having a sun gear, a ring gear, and a carrier, which rotatably supports a plurality of planetary gears meshed with the sun gear and the ring gear therebetween, as three rotating elements, and the first rotating element is the carrier, the second rotating element is the sun gear, and the third rotating element is the ring gear.

In this case, the deceleration mechanism is allowed to have a simple configuration, thereby enabling downsizing and a decrease in cost. Moreover, the motive power of the internal combustion engine and the motive power of the electric motor are able to be combined and distributed. In addition, the power transmission efficiency is able to be increased.

Further, in the first aspect of the invention, preferably the power transmitting device further includes: a requested power setting element, which sets requested power requested for the output shaft; and a control element, which performs the operation of the internal combustion engine and the operation of the electric motor according to the requested power set by the requested power setting element.

In this case, the control element favorably performs the operation of the internal combustion engine and the operation of the electric motor, by which the required requested power is able to be output from the output shaft.

Further, in the first aspect of the invention, preferably the control element controls the operation of the electric motor so that the internal combustion engine performs the operation within a range of a stall region to a maximum rpm.

In this case, the internal combustion engine performs the operation only within the range of the stall region to the maximum rpm, thereby enabling a preferable use of the internal combustion engine and providing good fuel consumption, lifetime, and the like of the internal combustion engine. It is, however, not applicable to the case where only the operation of the internal combustion engine is performed without performing the operation of the electric motor.

Further, in the first aspect of the invention, preferably the control element performs the operation of the internal combustion engine within an appropriate operating region of the internal combustion engine; and the control element compares the motive power of the internal combustion engine transmitted from the first rotating element to the second rotating element with the requested power and controls the electric motor to perform a power operation in the case where the motive power of the internal combustion engine is less than the requested power and to perform a regenerative operation in the case where the motive power of the internal combustion engine exceeds the requested power.

In this case, the internal combustion engine performs the operation within the appropriate operating region and therefore the internal combustion engine is able to be favorably used, thereby providing good fuel consumption, lifetime, and the like of the internal combustion engine. Further, since the electric motor performs the power operation or the regenerative operation according to whether the difference between the motive power of the internal combustion engine and the requested power is positive or negative, the requested power is always able to be output from the output shaft.

Further, in the first aspect of the invention, preferably the axis of the internal combustion engine output shaft is the same as the axis of the rotating shaft of the electric motor.

In this case, the power transmitting device is able to be downsized in the direction of the first main input shaft.

Further, the present invention is a power transmitting device for a hybrid vehicle having an internal combustion engine and an electric motor, the power transmitting device including: an internal combustion engine output shaft to which motive power is input from the internal combustion engine; a first main input shaft, which is disposed parallel to the internal combustion engine output shaft and selectively connected to the internal combustion engine output shaft by a main make-and-break device; a first sub input shaft, which is disposed coaxially with the first main input shaft; a first gear group, which is disposed on the first sub input shaft and composed of a plurality of gears selectively connected to the first sub input shaft via a first synchronizer; an output shaft, which is disposed parallel to the first main input shaft and outputs motive power to a driven unit via a counter shaft; a second gear group, which is composed of a plurality of gears fixed to the output shaft and mesh with the gears of the first gear group; and a deceleration mechanism, which is configured so as to be capable of rotating a first rotating element, a second rotating element, and a third rotating element differentially with respect to one another, wherein: the first rotating element is connected to the first main input shaft and the electric motor; the second rotating element is connected to the first sub input shaft; the third rotating element is connected to a lock mechanism, which is capable of locking the third rotating element; and the second rotating element decelerates motive power transmitted from the first rotating element and motive power transmitted from the third rotating element and transmits the motive powers to the output shaft via the first sub input shaft (Second aspect of the invention).

According to the second aspect of the invention, in the same manner as in the first aspect of the invention, the deceleration mechanism, which is configured so as to be capable of rotating the first rotating element, the second rotating element, and the third rotating element differentially with respect to one another, decelerates and transmits the motive power from the output shaft to the driven unit via the first sub input shaft from the second rotating element upon the input of the motive power transmitted from the first rotating element connected to the internal combustion engine and the electric motor and the motive power transmitted from the second rotating element connected to the internal combustion engine via the first sub input shaft. Therefore, the power transmitting device is able to transmit motive power to the driven unit at high efficiency in comparison with the case of transmitting the motive power of the internal combustion engine and the motive power of the electric motor via a synchronizer as in the power transmitting device described in Patent Document 1.

Further, with the first main input shaft connected to the internal combustion engine output shaft by the main make-and-break device, the first sub input shaft connected to the first main input shaft by the first make-and-break device, and the third rotating element locked by the lock mechanism, it is also possible to decelerate the motive power transmitted from the internal combustion engine and the electric motor to the first rotating element and to transmit the motive power to the driven unit via the second rotating element. Moreover, the vehicle is able to run while the electric motor performs the regenerative operation.

Further, in the second aspect of the invention, preferably the power transmitting device further includes: a second main input shaft, which is disposed parallel to the first main input shaft and always connected to the first main input shaft; a third sub input shaft, which is disposed coaxially with the second main input shaft; and a third gear group, which is disposed on the third sub input shaft and composed of a plurality of gears selectively connected to the third sub input shaft via a second synchronizer, and the gears constituting the second gear group mesh with the gears constituting the third gear group.

In this case, the variable speed stages are able to be increased while suppressing the length of the power transmitting device in the axial center direction of the first main input shaft.

Further, in the second aspect of the invention, preferably the deceleration mechanism is a planetary gear unit coaxially having a sun gear, a ring gear, and a carrier, which rotatably supports a plurality of planetary gears meshed with the sun gear and the ring gear therebetween, as three rotating elements, and the first rotating element is the carrier, the second rotating element is the sun gear, and the third rotating element is the ring gear.

In this case, the deceleration mechanism is allowed to have a simple configuration, thereby enabling downsizing and a decrease in cost. Moreover, the motive power of the internal combustion engine and the motive power of the electric motor are able to be combined and distributed. In addition, the power transmission efficiency is able to be increased.

Moreover, the present invention is a power transmitting device for a hybrid vehicle having an internal combustion engine and an electric motor, the power transmitting device including: an internal combustion engine output shaft to which motive power is input from the internal combustion engine; a first main input shaft, which is disposed parallel to the internal combustion engine output shaft and selectively connected to the internal combustion engine output shaft by a main make-and-break device; an intermediate input shaft, which is disposed coaxially with the internal combustion engine output shaft; a first sub input shaft, which is disposed coaxially with the intermediate input shaft and selectively connected to the intermediate input shaft by a first make-and-break device; a second sub input shaft, which is disposed coaxially with the intermediate input shaft and selectively connected to the intermediate input shaft by a second make-and-break device; an output shaft, which is disposed parallel to the first main input shaft and connected to the first sub input shaft and the second sub input shaft, in each case via a pair of gears, and outputs motive power to a driven unit via a counter shaft; and a deceleration mechanism configured so as to be capable of rotating a first rotating element, a second rotating element, and a third rotating element differentially with respect to one another, wherein: the first rotating element is connected to the first main input shaft and the electric motor; the second rotating element is connected to the intermediate input shaft and selectively connected to the first main input shaft by a third make-and-break device; the third rotating element is connected to a lock mechanism, which is capable of locking the third rotating element; and the second rotating element decelerates motive power transmitted from the first rotating element and motive power transmitted from the third rotating element and transmits the motive powers to the output shaft via the intermediate input shaft (Third aspect of the invention).

According to the third aspect of the invention, in the same manner as in the first and second aspects of the invention, the deceleration mechanism, which is configured so as to be capable of rotating the first rotating element, the second rotating element, and the third rotating element differentially with respect to one another, decelerates and transmits the motive power from the output shaft to the driven unit via the first sub input shaft from the second rotating element upon the input of the motive power transmitted from the first rotating element connected to the internal combustion engine and the electric motor and the motive power transmitted from the second rotating element connected to the internal combustion engine via the first sub input shaft. Therefore, the power transmitting device is able to transmit motive power to the driven unit at high efficiency in comparison with the case of transmitting the motive power of the internal combustion engine and the motive power of the electric motor via a synchronizer as in the power transmitting device described in Patent Document 1.

Further, with the first main input shaft connected to the internal combustion engine output shaft by the main make-and-break device, the first sub input shaft connected to the first main input shaft by the first make-and-break device, and the third rotating element locked by the lock mechanism, it is also possible to decelerate the motive power transmitted from the internal combustion engine and the electric motor to the first rotating element and to output the motive power to the driven unit via the second rotating element. Moreover, the vehicle is able to run while the electric motor performs the regenerative operation.

Further, in the third aspect of the invention, preferably the power transmitting device includes: a reverse drive gear fixed onto the intermediate input shaft; a reverse intermediate gear, which is fixed to a reverse intermediate shaft disposed parallel to the intermediate input shaft and meshes with the reverse drive gear; a first gear, which is fixed onto the output shaft and meshes with the gear fixed to the first sub input shaft; and a reverse driven gear, which meshes with a second gear, which is disposed on the output shaft and selectively connected to the output shaft via a synchronizer and meshes with a gear fixed to the second sub input shaft, and with the reverse intermediate gear fixed to the reverse intermediate shaft.

In this case, a backward stage is able to be provided while downsizing the power transmitting device in the direction of the first main input shaft.

Further, in the third aspect of the invention, preferably the deceleration mechanism is a planetary gear unit coaxially having a sun gear, a ring gear, and a carrier, which rotatably supports a plurality of planetary gears meshed with the sun gear and the ring gear therebetween, as three rotating elements, and the first rotating element is the carrier, the second rotating element is the sun gear, and the third rotating element is the ring gear.

In this case, the deceleration mechanism is allowed to have a simple configuration, thereby enabling downsizing and a decrease in cost. Moreover, the motive power of the internal combustion engine and the motive power of the electric motor are able to be combined and distributed. In addition, the power transmission efficiency is able to be increased.

Moreover, the present invention is a power transmitting device for a hybrid vehicle having an internal combustion engine and an electric motor, the power transmitting device including: an internal combustion engine output shaft to which motive power is input from the internal combustion engine; a first main input shaft, which is disposed parallel to the internal combustion engine output shaft and selectively connected to the internal combustion engine output shaft by a main make-and-break device; an intermediate input shaft, which is disposed coaxially with the internal combustion engine output shaft; a gear group, which is disposed on the intermediate input shaft and selectively connected to the intermediate input shaft via a synchronizer; an output shaft, which is disposed parallel to the first main input shaft and outputs motive power to a driven unit via a counter shaft; a second gear group, which is composed of a plurality of gears connected to the output shaft and meshes with the gears of the first gear group; and a deceleration mechanism configured so as to be capable of rotating a first rotating element, a second rotating element, and a third rotating element differentially with respect to one another, wherein: the first rotating element is connected to the first main input shaft and the electric motor; the second rotating element is connected to the intermediate input shaft and selectively connected to the first main input shaft by a make-and-break device; the third rotating element is connected to a lock mechanism, which is capable of locking the third rotating element; and the second rotating element decelerates motive power transmitted from the first rotating element and motive power transmitted from the third rotating element and transmits the motive powers to the output shaft via the intermediate input shaft (Fourth aspect of the invention).

According to the fourth aspect of the invention, in the same manner as in the first to third aspects of the invention, the deceleration mechanism, which is configured so as to be capable of rotating the first rotating element, the second rotating element, and the third rotating element differentially with respect to one another, decelerates and transmits the motive power from the output shaft to the driven unit via the first sub input shaft from the second rotating element upon the input of the motive power transmitted from the first rotating element connected to the internal combustion engine and the electric motor and the motive power transmitted from the second rotating element connected to the internal combustion engine via the first sub input shaft. Therefore, the power transmitting device is able to transmit motive power to the driven unit at high efficiency in comparison with the case of transmitting the motive power of the internal combustion engine and the motive power of the electric motor via a synchronizer as in the power transmitting device described in Patent Document 1.

Further, with the first main input shaft connected to the internal combustion engine output shaft by the main make-and-break device, the first sub input shaft connected to the first main input shaft by the first make-and-break device, and the third rotating element locked by the lock mechanism, it is also possible to decelerate the motive power transmitted from the internal combustion engine and the electric motor to the first rotating element and to output the motive power to the driven unit via the second rotating element. Moreover, the vehicle is able to run while the electric motor performs the regenerative operation.

Further, in the fourth aspect of the invention, preferably the power transmitting device includes: a reverse drive gear fixed onto the intermediate input shaft; a reverse intermediate gear, which is fixed to a reverse intermediate shaft disposed parallel to the intermediate input shaft and meshes with the reverse drive gear; a first driven gear, which is fixed onto the output shaft and meshes with a first drive gear constituting the first gear group; and a reverse driven gear, which meshes with a second driven gear, which is disposed on the output shaft and selectively connected to the output shaft via a synchronizer and constitutes the first gear group, and with the reverse intermediate gear, and the second gear group includes the first driven gear and the second driven gear.

In this case, a backward stage is able to be provided while downsizing the power transmitting device in the direction of the first main input shaft.

Further, in the fourth aspect of the invention, preferably the deceleration mechanism is a planetary gear unit coaxially having a sun gear, a ring gear, and a carrier, which rotatably supports a plurality of planetary gears meshed with the sun gear and the ring gear therebetween, as three rotating elements, and the first rotating element is the carrier, the second rotating element is the sun gear, and the third rotating element is the ring gear.

In this case, the deceleration mechanism is allowed to have a simple configuration, thereby enabling downsizing and a decrease in cost. Moreover, the motive power of the internal combustion engine and the motive power of the electric motor are able to be combined and distributed. In addition, the power transmission efficiency is able to be increased.

MODE FOR CARRYING OUT THE INVENTION

First Embodiment

Figure 1:
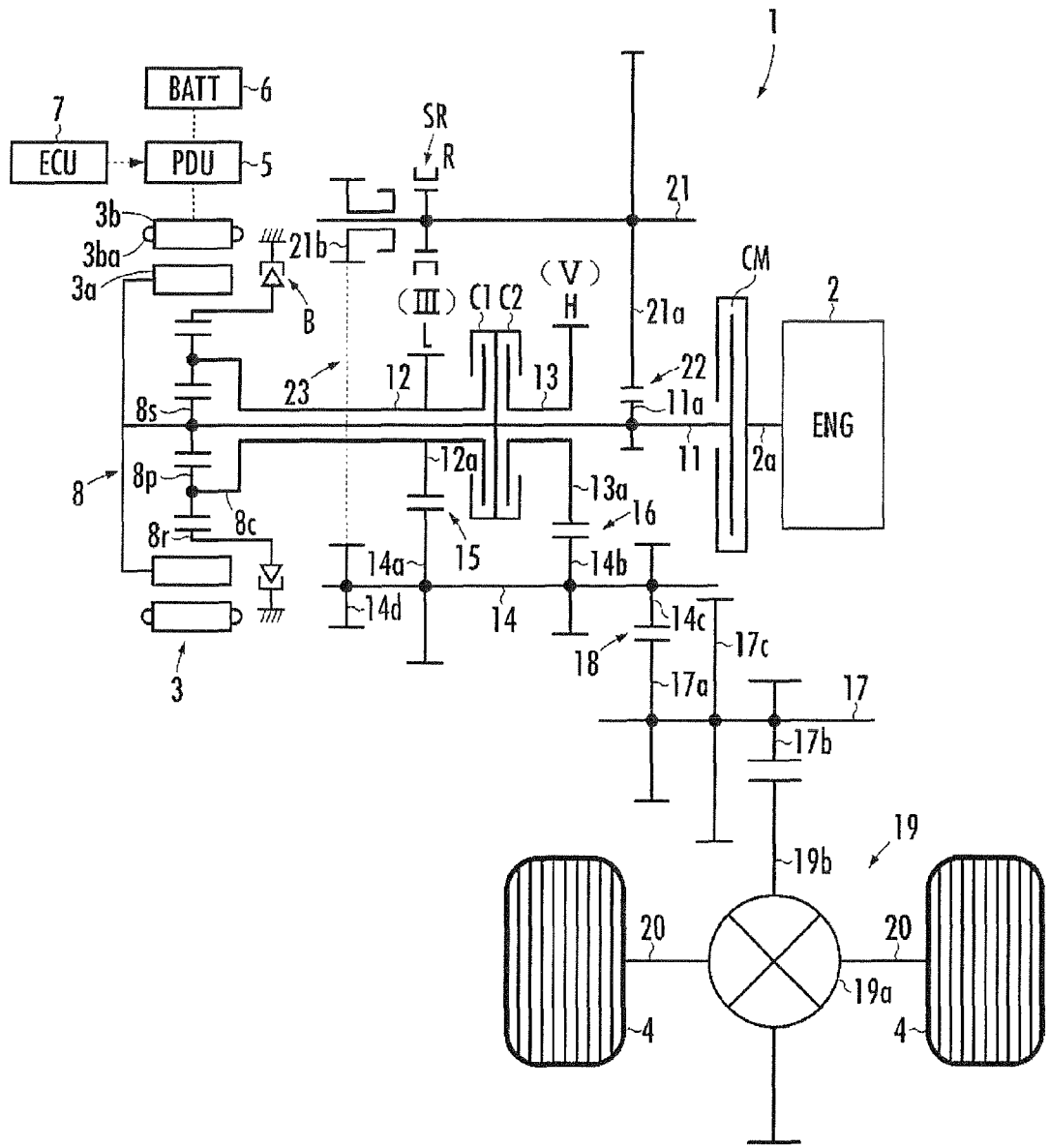
FIG. 1 is a diagram schematically illustrating the general configuration of a vehicle having a power transmitting device for a hybrid vehicle according to a first embodiment of the present invention.

A power transmitting device 1 for a hybrid vehicle according to a first embodiment of the present invention will be described below with reference to FIG. 1.

First, the configuration of the power transmitting device 1 will be described. The power transmitting device 1 is mounted on a hybrid vehicle including an engine 2, which is an internal combustion engine, and an electric motor (a motor generator) 3, as power generation sources. The power transmitting device 1 is configured to be able to transmit the motive power (driving force) of the engine 2 or/and the motive power of the electric motor 3 to a pair of driving wheels 4 and 4, which are driven units, and to drive the driving wheels 4 and 4.

The engine 2 is an internal combustion engine, which generates motive power (torque) by burning fuel such as gasoline, light oil, or alcohol, and has an output shaft 2a for use in outputting generated motive power to the outside. In the same manner as a normal automobile engine, the engine 2 adjusts the motive power, which is output from the engine 2 via the output shaft 2a, by controlling the opening degree of a throttle valve provided in an intake path, which is not illustrated, (controlling the intake air amount of the engine 2).

The electric motor 3 is a three-phase brushless DC motor in this embodiment and includes a hollow rotor (rotating body) 3a, which is rotatably supported in a housing (not illustrated) of the electric motor 3, and a stator (static part) 3b, which is fixed to the housing around the rotor 3a. The rotor 3a is provided with a plurality of permanent magnets attached thereto and the stator 3b is provided with a three-phase coil (armature winding) 3ba attached thereto. The stator 3b of the electric motor 3 is provided in a fixed manner to the housing, which is provided in an immovable part, which is stationary relative to the vehicle body, such as an outer case of the power transmitting device 1.

The coil 3ba of the electric motor 3 is electrically connected to a battery (secondary battery) 6 as a DC power supply via a power drive unit (hereinafter, referred to as "PDU") 6, which is a drive circuit including an inverter circuit. In addition, the PDU 5 is electrically connected to an electronic control unit (hereinafter, referred to as "ECU") 7.

The ECU 7 is electrically connected to the engine 2 and the like, though not illustrated, in addition to the PDU 5 and controls the operation of the power transmitting device 1 including the engine 2. The ECU 7 functions as a requested power setting element, which sets the motive power required to be transmitted to the driving wheels 4 and 4 on the basis of the vehicle speed or the revolutions per minute (rpm) of the engine 2, and functions as a control element, which drives the engine 2 or the electric motor 3 according to requested power set by the requested power setting element.

The ECU 7 controls the electric current, which flows through the coil 3ba, via the PDU 5, thereby adjusting the motive power (torque) that the electric motor 3 outputs from the rotor 3a. In this case, the electric motor 3 performs a power operation for generating a power torque in the rotor 3a by means of electric power supplied from the battery 6 to function as a motor by controlling the PDU 5. Specifically, the electric power supplied to the stator 3b is converted to motive power and output to the rotor 3a. Further, with the control of the PDU 5, the electric motor 3 generates electricity by means of rotational energy given to the rotor 3a from the outside and performs a regenerative operation for generating a regenerative torque in the rotor 3a while giving the electric power energy to the battery 6 to function as a generator. Specifically, motive power input to the rotor 3a is converted to the electric power in the stator 3b.

The ECU 8 is an electronic circuit unit including a CPU, RAM, ROM, interface circuit, and the like and controls the operation of the power transmitting device 1 by performing control processing, which is defined by a previously-installed program. In this instance, the functions implemented by the control processing of the ECU 7 include a function of controlling the operation of the electric motor 3 via the PDU 5, a function of controlling the operation of the engine 2 via an actuator for engine control such as an actuator for a throttle valve, which is not illustrated, a function of controlling the operations of the sleeves of various clutches and various synchronizers described later via an actuator or a drive circuit, which are not illustrated, and a function of controlling a brake B described later via a drive circuit or the like.

The power transmitting device 1 includes a planetary gear unit 8, which is a deceleration mechanism, as a combining-distributing mechanism, which combines the motive power of the engine 2 with the motive power of the electric motor 3 and distributes the motive power of the engine 2 to the electric motor 3.

The output shaft 2a of the engine 2 is connected to a main input shaft (first main input shaft) 11, which is disposed parallel to the output shaft 2a and receives an input of the motive power from the engine 2 via a main clutch (a main make-and-break device) CM. The main input shaft 11 extends from the engine 2 side to the electric motor 3 side. The main input shaft 11 is connected or disconnected to or from the output shaft 2a of the engine 2 by the main clutch CM.

The main clutch CM is a clutch mechanism operating in such a way that the output shaft 2a of the engine 2 operates so as to be connected or disconnected to or from the main input shaft 11 (a clutch mechanism selectively operable between the connected state and the disconnected state) under the control of the ECU 7. When the main clutch CM is set to the connected state, the main input shaft 11 is connected to the output shaft 2a, thereby enabling the power transmission from the output shaft 2a to the main input shaft 11. Further, when the main clutch CM is set to the disconnected state, the connection between the main input shaft 11 and the output shaft 2a is broken, thereby interrupting the power transmission from the output shaft 2a to the main input shaft 11.

Two sub shafts, namely a first sub input shaft 12 and a second sub input shaft 13 are disposed coaxially with the main input shaft 11. Further, the main input shaft 11 and the first sub input shaft 12 are connected to each other via a first clutch (a first make-and-break device) C1, or motive power is transmitted between the main input shaft 11 and the first sub input shaft 12 via a planetary gear 8p. Moreover, the main input shaft 11 and the second sub input shaft 13 are connected to each other via a second clutch (a second make-and-break device) C2. The side portion of the engine 2 of the main input shaft 11 and the side portion of the first sub input shaft 12 on the electric motor 3 side are rotatably supported by shaft bearings, which are not illustrated.

The first clutch C1 is a clutch mechanism that operates in such a way that the main input shaft 11 operates so as to be connected or disconnected to or from the first sub input shaft 12 under the control of the ECU 7. The second clutch C2 is a clutch mechanism that operates in such a way that the main input shaft 11 operates so as to be connected or disconnected to or from the second sub input shaft 13 under the control of the ECU 7.

When the first clutch C1 is set to the connected state, the first sub input shaft 12 is connected to the main input shaft 11. In this state, only the power transmission from the main input shaft 11 to the first sub input shaft 12 is possible and the power transmission from the main input shaft 11 to the second sub input shaft 13 is interrupted. Further, when the second clutch C2 is set to the connected state, the second sub input shaft 13 is connected to the main input shaft 11. In this state, the power transmission from the main input shaft 11 to the second sub input shaft 13 is possible and the power transmission from the main input shaft 11 to the first sub input shaft 12 is interrupted. Note that both of the first clutch C1 and the second clutch C2 are not set to the connected state at a time and only one of the first clutch C1 and the second clutch C2 is selectively set to the connected state.

An output shaft 14 is disposed parallel to the main input shaft 11. The output shaft 14 and the first sub input shaft 12 are connected to each other via a third speed gear pair 15. The third speed gear pair 15 is composed of a low speed gear 14a fixed onto the output shaft 14 and a third speed gear 12a fixed onto the first sub input shaft 12, which mesh with each other. Further, the output shaft 14 and the second sub input shaft 13 are connected to each other via a fifth speed gear pair 16. The fifth speed gear pair 16 is composed of a high speed gear 14b fixed onto the output shaft 14 and a fifth speed gear 13a fixed onto the second sub input shaft 13, which mesh with each other. In addition, a final gear 14c is fixed onto the output shaft 14. Both ends of the output shaft 14 are rotatably supported by shaft bearings, which are not illustrated.

The deceleration mechanism 8 is provided inside the electric motor 3. A part or all of the rotor 3a, the stator 3b, and the coil 3ba constituting the electric motor 3 are disposed so as to be superposed over the power combining mechanism 8 in the direction (the circumferential direction) perpendicular to the direction of axis of the main input shaft 11, thereby enabling a reduction in size of the power transmitting device 1 favorably.

The deceleration mechanism 8 is composed of a differential device capable of rotating a first rotating element, a second rotating element, and a third rotating element differentially with respect to one another. The differential device constituting the deceleration mechanism 8 is a single-pinion type planetary gear unit in this embodiment and is coaxially provided with three rotating elements, a sun gear (the first element) 8s, a ring gear (the third element) 8r; and a carrier (the second element) 8c, which rotatably supports a plurality of planetary gears 8p meshed with the ring gear 8r and the sun gear 8s between the sun gear 8s and the ring gear 8r. These three rotating elements 8s, 8r, and 8c are capable of transmitting motive power therebetween as has been known and rotate while keeping the relationship between the rpms (rotation speeds) of the rotating elements in a collinear relationship.

The sun gear 8s is fixed to one end of the main input shaft 11 on the electric motor 3 side and connected to the main input shaft 11 so as to rotate by interlocking with the main input shaft 11. Further, the sun gear 8s is fixed to the rotor 3a on the opposite side to the engine 2 and connected to the rotor 3a so as to rotate by interlocking with the rotor 3a of the electric motor 3. Thereby, the sun gear 8s, the main input shaft 11, and the rotor 3a rotate by interlocking with one another.

A brake B, which is a lock mechanism, is disposed in the ring gear 8r. The brake B engages so as to freely switch between a state where the ring gear 8r is fixed to a housing, which is an immovable part, to block the rotation of the ring gear 8r (hereinafter, the state is referred to as "lock state") and a state where the fixation is released (hereinafter, referred to as "release state"). The brake B is preferably a two-way clutch. The two-way clutch is capable of selectively switching for blocking the rotation in one of the directions of the rotations (the forward rotation and the reverse rotation) of the ring gear 8r while allowing only the rotation in the other direction. The brake B, however, may be capable of selectively switching between the state of blocking the rotations in both directions of the ring gear 8r and the state of allowing the rotations in both directions.

The carrier 8c is fixed to one end of the first sub input shaft 12 on the electric motor 3 side so as to rotate by interlocking with the first sub input shaft 12 and connected to the first sub input shaft 12.

As for the components following the final gear 14c, for example, a counter shaft 17 is disposed parallel to the output shaft 14. Further, the output shaft 14 and the counter shaft 17 are connected to each other via a pair of counter gears 18. The pair of counter gears 18 is composed of the final gear 14c fixed onto the output shaft 14 and a gear 17a fixed onto the counter shaft 17, which mesh with each other.

The counter shaft 17 is connected to the driving wheels 4 and 4 via a differential gear unit 19 between the driving wheels 4 and 4. The differential gear unit 19 includes a gear case 19a containing side gears, which are not illustrated, connected to the driving wheels 4 and 4 via axles 20 and 20, respectively, and a gear 19b fixed to the outer periphery of the gear case 19a. Further, the gear 19b of the differential gear unit 19 is meshed with a gear 17b fixed onto the counter shaft 17. This causes the counter shaft 17 to be connected to the driving wheels 4 and 4 via the differential gear unit 19 so as to rotate by interlocking with the driving wheels 4 and 4.

A parking gear 17c meshing with a gear of a parking mechanism, which is not illustrated, is also fixed onto the counter shaft 17. Both ends of the counter shaft 17 are rotatably supported by shaft bearings, which are not illustrated.

An input transmission shaft 21 is disposed parallel to the main input shaft 11. Further, the main input shaft 11 and the input transmission shaft 21 are always connected to each other via a pair of gears 22. The pair of gears 22 is composed of a gear 11a fixed onto the main input shaft 11 and a gear 21a fixed onto the input transmission shaft 21, which mesh with each other.

Moreover, the input transmission shaft 21 is provided with a rotatable reverse gear 21b on the input transmission shaft 21. The input transmission shaft 21 and the output shaft 14 are connected to each other via a pair of reverse gears 23. The pair of reverse gears 23 is composed of the reverse gear 21b and a gear 14d fixed onto the output shaft 14, which mesh with each other.

The input transmission shaft 21 is provided with a reverse synchronizer (a selection device, a selector) SR capable of switching between the connection and the disconnection of the reverse gear 21b and the input transmission shaft 21. The reverse synchronizer SR is well-known and connects or disconnects the reverse gear 21b to or from the input transmission shaft 21 by moving a sleeve in the axial direction of the input transmission shaft 21 using an actuator and a shift fork, which are not illustrated. In a state where the sleeve is located in the position illustrated in FIG. 1 (hereinafter, referred to as "neutral state"), the reverse gear 21b is disconnected from the input transmission shaft 21. In a state where the sleeve moves to the left side in FIG. 1, the reverse gear 21b is connected to the input transmission shaft 21.

In the power transmitting device 1 having the above configuration, the motive power output from the output shaft 2a of the engine 2 is transmitted to the output shaft 14 through a power transmission path according to the states of the first and second clutches C1 and C2 when the main clutch CM is in the connected state (hereinafter, referred to as "ON state"). Thereby, the power transmitting device 1 ensures variable speed with three forward speed stages and one backward speed stage.

Specifically, if the first clutch C1 and the second clutch C2 are set to OFF state, the brake B is set to a lock state, and the sleeve of the reverse synchronizer SR is set to the neutral state, the motive power output from the engine 2 or the electric motor 3 is transmitted from the sun gear 8s to the output shaft 14 via the carrier 8c, the first sub input shaft 12, the third speed gear pair 15, and the like, by which a low speed stage (first speed stage) is established.

If the first clutch C1 is set to the ON state, the second clutch C2 is set to the OFF state, the brake B is set to the lock state, and the sleeve of the reverse synchronizer SR is set to the neutral state, the motive power output from the engine 2 or the electric motor 3 is transmitted from the sun gear 8s to the output shaft 14 via the first sub input shaft 12, the third speed gear pair 15, and the like, by which a third speed stage is established.

If the first clutch C1 is set to the OFF state, the second clutch C2 is set to the ON state, the brake B is set to the lock state, and the sleeve of the reverse synchronizer SR is set to the neutral state, the motive power output from the engine 2 or the electric motor 3 is transmitted from the sun gear 8s to the output shaft 14 via the second sub input shaft 13, the fifth speed gear pair 16, and the like, by which a fifth speed stage is established.

Further, if the first clutch C1 and the second clutch C2 are set to OFF state, the brake B is set to a release state, and the sleeve of the reverse synchronizer SR is set to a state of being placed on the left side in the diagram, the motive power output from the engine 2 or the electric motor 3 is transmitted from the sun gear 8s to the output shaft 14 via the pair of gears 22, the pair of reverse gears 23, and the like, by which a reverse stage is established.

Further, when the main clutch CM is in the ON state, the motive power output from the output shaft 2a of the engine 2 is input from the sun gear 8s to the deceleration mechanism 8 via the main input shaft 11. Moreover, the motive power output from the electric motor 3 is also input from sun gear 8s to the deceleration mechanism 8. In this manner, both of the motive power of the engine 2 and the motive power of the electric motor 3 are input to the sun gear 8s. Therefore, the motive power of the engine 2 and the motive power of the electric motor 3 are able to be input from the sun gear 8s to the deceleration mechanism 8 independently of whether any other motive power is present or of the direction thereof. Accordingly, the engine 2 is able to be started, for example, in the neutral condition where the vehicle is stopped with the electric motor 3 running.

Moreover, the brake B blocks the rotation of the ring gear 8r, by which motive power according to the motive power input to the sun gear 8s is output from the carrier 8c and transmitted to the output shaft 14 via the first sub input shaft 12 and the third speed gear pair 15. The motive power output from the deceleration mechanism 8 also assists the motive power transmitted from the engine 2 to the output shaft 14 without passing through the deceleration mechanism 8. In addition, the motive power is able to be output from the deceleration mechanism 8 only with the motive power of the electric motor 3 without the engine 2 driven. If the rotation direction of the sun gear 8s differs from the direction of the torque generated in the electric motor 3, the electric motor 3 performs the regenerative operation.

In addition, when the reverse synchronizer SR connects the reverse gear 21b to the input transmission shaft 21, the rotation of the main input shaft 11, which rotates in the direction in which the output shaft 2a of the engine 2 rotates at driving the engine 2 (hereinafter, the direction is referred to as "forward rotation") (hereinafter, the motion is referred to as "rotate in the forward direction"), is reversed and transmitted to the counter shaft 17, by which the counter shaft 17 rotates in the direction opposite to the forward direction (hereinafter, the opposite direction is referred to as "reverse direction") (hereinafter, the motion is referred to as "rotate in the reverse direction"). Therefore, when the reverse synchronizer SR connects the reverse gear 21b to the input transmission shaft 21 and if the output shaft 2a of the engine 2 rotates in the forward direction, the axles 20 and 20 rotate in the reverse direction in either case of the forward rotation and the reverse rotation of the rotor 3a of the electric motor 3 as long as the main input shaft 11 rotates in the forward direction, and the driving wheels 4 and 4 rotate in the direction causing the vehicle to move backward. On the other hand, when the reverse gear 21b is disconnected from the input transmission shaft 21 and if the main input shaft 11 rotates in the forward direction, the axles 20 and 20 rotate in the forward direction and the driving wheels 4 and 4 rotate in the direction causing the vehicle to move forward. Accordingly, the engine 2 is able to be started to move the vehicle backward, for example, in the neutral condition where the vehicle is stopped with the electric motor 3 running.

Subsequently, the operation modes of the power transmitting device 1 will be described.

In this embodiment, the main modes of the vehicle include an engine mode in which only the engine 2 is used as a power generation source of the vehicle, an EV mode in which only the electric motor 3 is used as a power generation source of the vehicle, and an HEV mode in which both of the engine 2 and the electric motor 3 are driven. The HEV mode includes an assist mode in which the output of the engine 2 is combined with the output of the electric motor 3 and a regenerative mode in which the output of the engine 2 is distributed to the electric motor 3 so that the electric motor 3 performs a regenerative operation. In the regenerative mode, the battery 6 is charged by the regenerative operation of the electric motor 3. In the EV mode, the electric motor 3 outputs motive power by consuming the electric energy accumulated in the battery 6.

Then, in this embodiment, the ECU 7 sets requested power (requested driving force) of the vehicle by using a predetermined map or the like on the basis of an accelerator manipulated variable, a vehicle speed, or the like of the vehicle and selects each mode or variable speed stage according to the requested power. Further, the ECU 7 controls the power transmitting device 1 according to the selected mode, variable speed stage, or the like.

For example, the ECU 7 selects the assist mode if the motive power output from the engine 2 and input to the deceleration mechanism 8 (hereinafter, referred to as "appropriate operating power") is less than the requested power when the engine 2 is operated in an appropriate operating region such as, for example, a region in which the fuel consumption is favorable. In this instance, the ECU 7 controls the battery 6 to supply the motive power to offset the shortage against the requested power. If there is a need to operate the electric motor 3 at an output or speed exceeding the rated output or the maximum rpm in order to offset the shortage, however, the electric motor 3 is operated at the rated output or the maximum rpm and the output of the engine 2 is increased. Moreover, when the appropriate operating power exceeds the requested power, the ECU 7 selects the regenerative mode to charge the battery 6 with differential motive power (energy) obtained by decreasing a transmission loss caused by gears or the like from motive power. Also when the charge level (SOC) of the battery 6 is low, the ECU 7 selects the regenerative mode to advance the charge of the battery 6 and increases the output of the engine 2.

Second Embodiment

Figure 2:
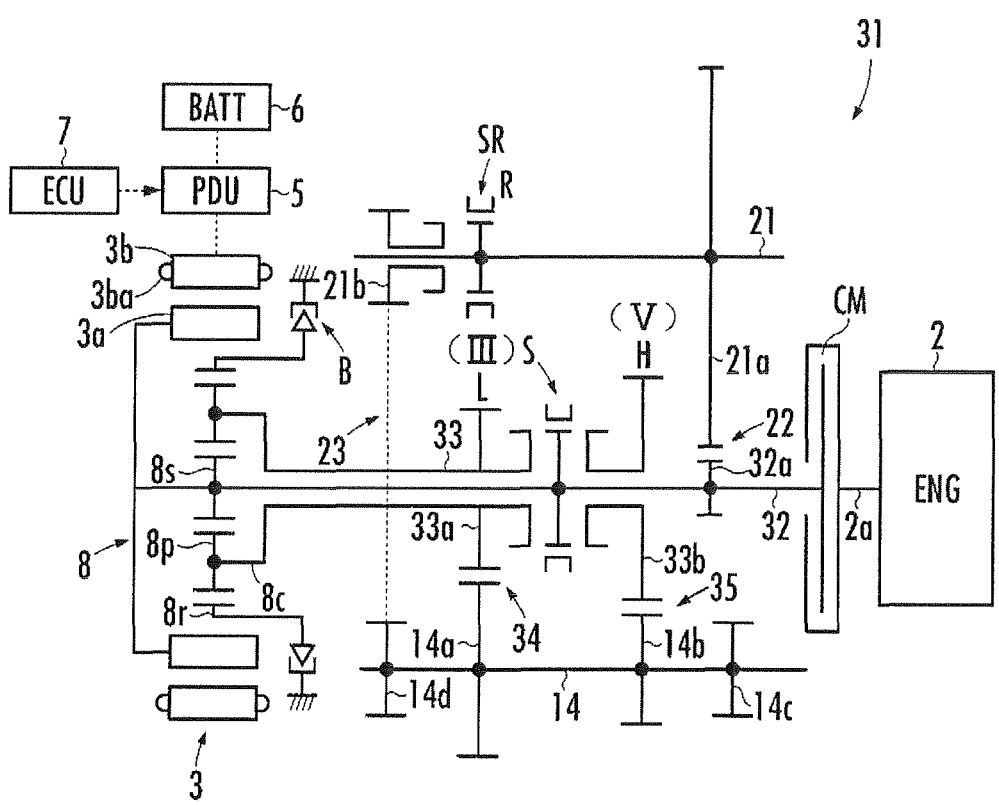
FIG. 2 is a diagram schematically illustrating the general configuration of a vehicle having a power transmitting device for a hybrid vehicle according to a second embodiment of the present invention.

A power transmitting device 31 for a hybrid vehicle according to a second embodiment of the present invention will be described with reference to FIG. 2. The counter shaft 17 and subsequent constituents are the same as those of FIG. 1 and therefore omitted in FIG. 2.

The power transmitting device 31 is similar to the power transmitting device 1, and therefore only the constituents different from those of the power transmitting device 1 are described below. The power transmitting device 31 ensures variable speed with three forward speed stages and one backward speed stage in the same manner as the power transmitting device 1.

The power transmitting device 31 includes a synchronizer (a first synchronizer) S, instead of the first and second clutches C1 and C2 of the power transmitting device 1.

The output shaft 2a of the engine 2 is connected to a main input shaft (a first main input shaft) 32, to which the motive power from the engine 2 is input via the main clutch CM.

A sub input shaft (a first sub input shaft) 33 is disposed coaxially with the main input shaft 32. The main input shaft 32 and the sub input shaft 33 are connected to each other via a synchronizer S. The synchronizer S is provided in the sub input shaft 33 and is configured so as to be capable of switching between the connection and the disconnection of the third speed gear (a low speed gear) 33a or a fifth speed gear (a high speed gear) 33b and the main input shaft 32.

The synchronizer S is a well-known clutch such as a synchro clutch and selectively connects the third speed gear 33a or the fifth speed gear 33b to the main input shaft 32 by moving the sleeve in the axial direction of the sub input shaft 33 using an actuator and a shift fork, which are not illustrated. If the sleeve moves to the left side in the diagram, the third speed gear 33a is connected to the main input shaft 32. On the other hand, if the sleeve moves to the right side in the diagram, the fifth speed gear 33b is connected to the main input shaft 32.

Then, the sub input shaft 33 and the output shaft 14 are connected to each other via a third speed gear pair (a pair of gears) 34. The third speed gear pair 34 is composed of the third speed gear 33a and a low speed gear 14a fixed onto the output shaft 14, which mesh with each other. Further, the sub input shaft 33 and the output shaft 14 are connected to each other via the fifth speed gear pair 35. The fifth speed gear pair 35 is composed of the high speed gear 33b and a high speed gear 14b fixed onto the output shaft 14, mesh with each other.

The sun gear 8s is fixed to one end of the main input shaft 32 on the electric motor 3 side and the sun gear 8s rotates by interlocking with the main input shaft 32 and the rotor 3a.

In the power transmitting device 31 having the above configuration, the motive power output from the output shaft 2a of the engine 2 is transmitted to the output shaft 14 through a power transmission path according to the state of the synchronizer S when the main clutch CM is in the ON state.

Further, when the main clutch CM is in the ON state, the motive power output from the output shaft 2a of the engine 2 is input from the sun gear 8s to the deceleration mechanism 8 via the main input shaft 32. Moreover, the motive power output from the electric motor 3 is also input from the sun gear 8s to the deceleration mechanism 8. In this manner, both of the motive power of the engine 2 and the motive power of the electric motor 3 are input to the sun gear 8s. Therefore, the motive power of the engine 2 and that of the electric motor 3 are able to be input from the sun gear 8s to the deceleration mechanism 8 independently of whether any other motive power is present or of the direction thereof. Accordingly, the engine 2 is able to be started, for example, in the neutral condition where the vehicle is stopped with the electric motor 3 running.

Moreover, the brake B blocks the rotation of the ring gear 8r, by which motive power according to the motive power input to the sun gear 8s is output from the carrier 8c and transmitted to the output shaft 14 via the sub input shaft 33 and the third speed gear pair 34. The motive power output from the deceleration mechanism 8 also assists the motive power transmitted from the engine 2 to the output shaft 14 without passing through the deceleration mechanism 8. In addition, the motive power is able to be output from the deceleration mechanism 8 only with the motive power of the electric motor 3 without the engine 2 driven. If the rotation direction of the sun gear 8s differs from the direction of the torque generated in the electric motor 3, the electric motor 3 performs the regenerative operation.

The operation modes and the variable speed stages of the power transmitting device 31 are the same as those of the power transmitting device 1 and therefore the description thereof is omitted.

Third Embodiment

Figure 3:
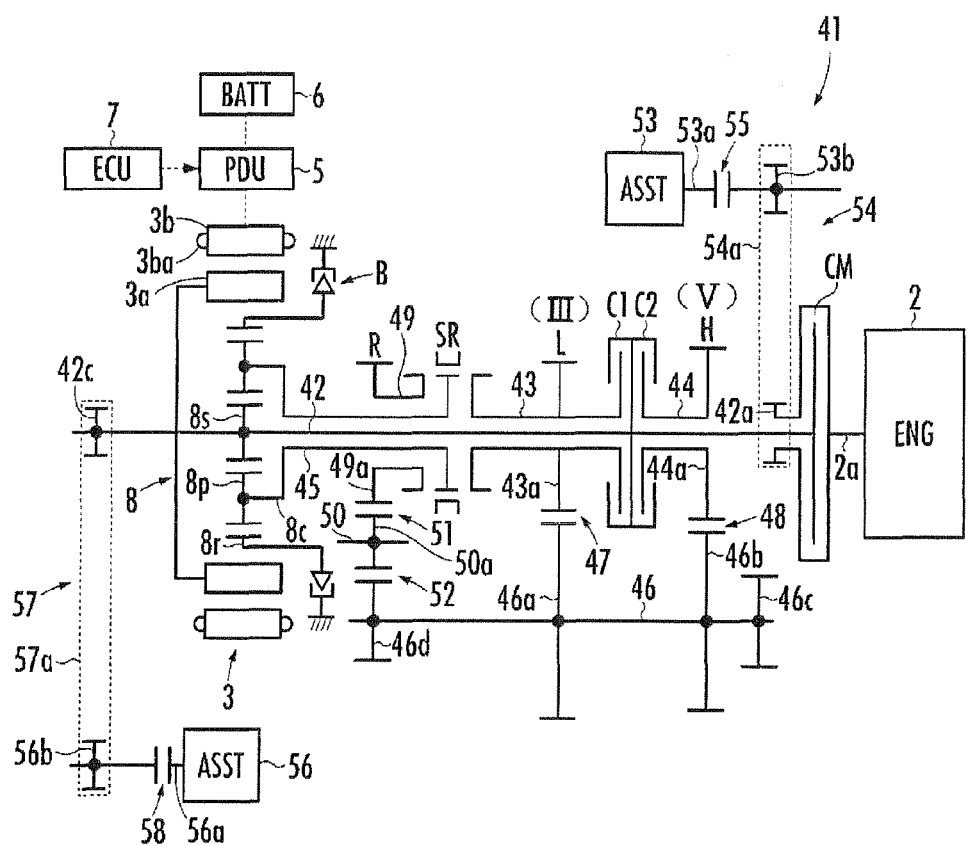
FIG. 3 is a diagram schematically illustrating the general configuration of a vehicle having a power transmitting device for a hybrid vehicle according to a third embodiment of the present invention.

A power transmitting device 41 for a hybrid vehicle according to a third embodiment of the present invention will be described with reference to FIG. 3. The power transmitting device 41 is similar to the power transmitting device 1, and therefore only the constituents different from those of the power transmitting device 1 are described below. The counter shaft 17 and subsequent constituents are the same as those of FIG. 1 and therefore omitted in FIG. 3.

While the power transmitting device has the reverse synchronizer SR provided in the input transmission shaft 21 parallel to the main input shaft 11, the power transmitting device 41 has a reverse synchronizer SR provided coaxially with a main input shaft (a first main input shaft) 42.

Further, the power transmitting device 41 is configured to transmit the motive power of the engine 2 or/and the motive power of the electric motor 3 not only to the driving wheels 4 and 4, but also to auxiliary devices 53 and 56 mounted on the vehicle so that the auxiliary devices 53 and 56 are driven. The auxiliary devices 53 and 56 are, for example, a compressor of an air conditioner, a water pump, an oil pump, and the like.

The output shaft 2a of the engine 2 is connected to a main input shaft 42, which is disposed parallel to the output shaft 2a and to which the motive power from the engine 2 is input via the main clutch CM.

Three sub shafts, namely a first sub input shaft 43, a second sub input shaft 44, and a third sub input shaft 45 are each disposed coaxially with the main input shaft 42. The main input shaft 42 and the first sub input shaft 43 are connected to each other via the first clutch C1, or motive power is transmitted between the main input shaft 42 and the first sub input shaft 43 via a planetary gear 8p. Further, the main input shaft 42 and the second sub input shaft 44 are connected to each other via the second clutch C2.

The sun gear 8s is fixed to one end of the main input shaft 42 on the electric motor 3 side. The sun gear 8s rotates by interlocking with the main input shaft 42 and the rotor 3a.

Further, an output shaft 46 is disposed parallel to the main input shaft 42. The output shaft 46 and the first sub input shaft 43 are connected to each other via a third speed gear pair 47. The third speed gear pair 47 is composed of a low speed gear 46a fixed onto the output shaft 46 and a third speed gear 43a fixed onto the first sub input shaft 43, which mesh with each other. Moreover, the output shaft 46 and the second sub input shaft 44 are connected to each other via a fifth speed gear pair 48. The fifth speed gear pair 48 is composed of a high speed gear 46b fixed onto the output shaft 46 and a fifth speed gear 44a fixed onto the second sub input shaft 44, which mesh with each other. In addition, a final gear 46c is fixed onto the output shaft 46.

A reverse shaft 49 is disposed coaxially with the main input shaft 42. The reverse shaft 49 is provided with a reverse gear 49a fixed onto the reverse shaft 49.

There is provided a reverse synchronizer SR capable of switching between the connection and the disconnection of the first sub input shaft 43 and the third sub input shaft 45 and between the connection and the disconnection of the third sub input shaft 45 and the reverse shaft 49. The reverse synchronizer SR is well-known and performs the connection or disconnection by moving the sleeve in the axial direction of the reverse shaft 46 using an actuator and a shift fork, which are not illustrated. If the sleeve is in the neutral position illustrated in FIG. 3, the first sub input shaft 43 is disconnected from the third sub input shaft 45 and the third sub input shaft 45 is disconnected from the reverse shaft 49. If the sleeve moves to the right side in the diagram, the first sub input shaft 43 is connected to the third sub input shaft 45. If the sleeve moves to the left side in the diagram, the third sub input shaft 45 is connected to the reverse shaft 49. In this manner, the first sub input shaft 43 is connected to the carrier 8c via the reverse synchronizer SR and the third sub input shaft 45.

Moreover, a reverse intermediate shaft 50 is disposed parallel to the main input shaft 42. The reverse shaft 49 and the reverse intermediate shaft 50 are connected to each other via a pair of reverse gears 51. The pair of reverse gears 51 is composed of a reverse gear 49a fixed onto the reverse shaft 49 and a gear 50a fixed onto the reverse intermediate shaft 50, which mesh with each other. The reverse intermediate shaft 50 and the output shaft 46 are connected to each other via a pair of reverse gears 52. The pair of reverse gears 52 is composed of a gear 50a fixed onto the reverse intermediate shaft 50 and a gear 46d fixed onto the output shaft 46, which mesh with each other.

Further, an input shaft 53a of an auxiliary device 53 is disposed parallel to the main input shaft 42. In addition, the main input shaft 42 and the input shaft 53a of the auxiliary device 53 are connected to each other via a transmission mechanism 54. The transmission mechanism 54 is composed of a gear 42a fixed to the main clutch CM and a gear 53b fixed onto the input shaft 53a, which are connected to each other via a belt 54a. The transmission mechanism 54 may be composed of the gear 42a and the gear 53b, which are connected to each other via a chain or the like. An auxiliary device clutch 55 is inserted in the input shaft 53a of the auxiliary device 53, and the gear 53b and the input shaft 53a of the auxiliary device 53 are coaxially connected to each other via the auxiliary device clutch 55.

Moreover, an input shaft 56a of an auxiliary device 56 is disposed parallel to the main input shaft 42. In addition, the main input shaft 42 is connected to the input shaft 56a of the auxiliary device 56 via a transmission mechanism 57. The transmission mechanism 57 is composed of a gear 42c fixed to the main input shaft 42 in the outside of the sun gear 8s opposite to the engine 2 side and a gear 56b fixed onto the input shaft 56a, which are connected to each other via a belt 57a. The transmission mechanism 57 may be composed of the gear 42c and the gear 56b, which are connected to each other via a chain or the like. An auxiliary device clutch 58 is inserted in the input shaft 56a of the auxiliary device 56, and the gear 56b and the input shaft 56a of the auxiliary device 56 are coaxially connected to each other via the auxiliary device clutch 58.

The auxiliary device clutches 55 and 58 are clutches that connect or disconnect the gears 53b and 56b to or from the input shafts 53a and 56a of the auxiliary devices 53 and 56 under the control of the ECU 7. In this case, if the auxiliary device clutches 55 and 58 are set to the connected state, the gears 53b and 56b are connected to the input shafts 53a and 56a of the auxiliary devices 53 and 56, so as to rotate integrally, via the auxiliary device clutches 55 and 58. Further, in a state, if any, where an air conditioner or the like is not driven, setting the auxiliary device clutches 55 and 58 to the disconnected state releases the connection between the gears 53b and 56b and the input shafts 53a and 56a of the auxiliary devices 53 and 56 made by the auxiliary device clutches 55 and 58. In this state, the power transmission to the main input shaft 42 and the input shafts 53a and 56a of the auxiliary devices 53 and 56 is interrupted. Although not illustrated, if pressure is accumulated in a pressure storage device in advance, the pressure storage device is able to function as an oil pump even if driving is impossible.

When the reverse synchronizer SR connects the third sub input shaft 45 to the reverse shaft 49 and the brake B is locked to block the rotation of the ring gear 8r at the reverse stage, the rotation of the main input shaft 42, which rotates in the forward direction, is reversed and is transmitted to a counter shaft 46, and the counter shaft 46 rotates in the reverse direction. Therefore, when the reverse synchronizer SR connects the third sub input shaft 45 to the reverse shaft 49 and if the output shaft 2a of the engine 2 rotates in the forward direction, the axles 20 and 20 rotate in the reverse direction in either case of the forward rotation and the reverse rotation of the rotor 3a of the electric motor 3 as long as the main input shaft 42 rotates in the forward direction, and then the driving wheels 4 and 4 rotate in the direction causing the vehicle to move backward. On the other hand, when the reverse gear 46a is disconnected from the first sub input shaft 43 and if the main input shaft 42 rotates in the forward direction, the axles 20 and 20 rotate in the forward direction and the driving wheels 4 and 4 rotate in the direction causing the vehicle to move forward. Accordingly, the engine 2 is able to be started to move the vehicle backward, for example, in the neutral condition where the vehicle is stopped with the electric motor 3 running.

The gear 42a fixed to the main clutch CM always rotates when the output shaft 2a of the engine 2 rotates independently of the connected state of the main clutch CM. On the other hand, the gear 42c fixed to the main input shaft 42 always rotates independently of whether the output shaft 2a rotates as long as the main input shaft 42 rotates. Therefore, when the engine 2 is running even if the vehicle stops, the auxiliary device 53 is able to be driven. Moreover, even if the engine 2 stops, the auxiliary device 56 is able to be driven by operating the electric motor 3.

Further, running the engine 2 and setting the main clutch CM to the ON state in the stop state of the vehicle enables the battery 6 to be charged by the regenerative operation of the electric motor 3.

Hereinafter, the variable speed stage in the operation mode of the power transmitting device 41 will be described. The power transmitting device 41 ensures variable speed with three forward speed stages and one backward speed stage in each of the three operation modes, the engine mode, the EV mode, and the HEV mode.

[Engine Mode, Low Speed Stage]

Figure 4:
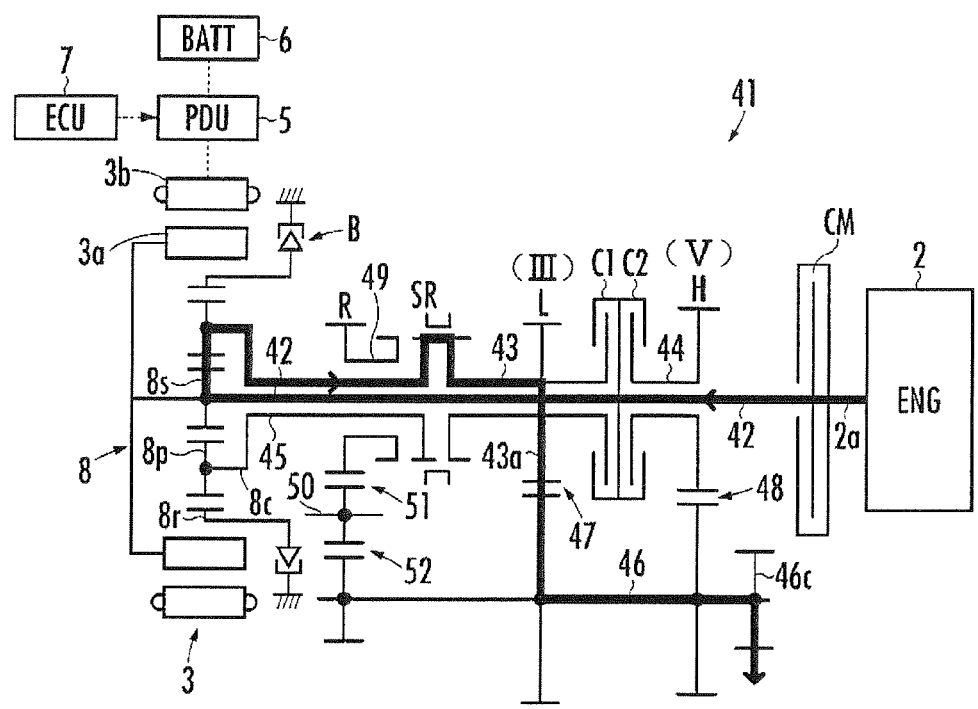
FIG. 4 is a diagram schematically illustrating the power transmission state of the power transmitting device for a hybrid vehicle according to the third embodiment at a low speed stage in an engine mode.

FIG. 4 illustrates the power transmission state of the power transmitting device 41 at the low speed stage (the first speed state) in the engine mode. At the low speed stage in the engine mode, the ECU 7 sets the main clutch CM to the ON state, the first clutch C1 and the second clutch C2 to the OFF state, the brake B to the lock state, the reverse synchronizer SR to the state where the sleeve is moved to the right side in the diagram, the engine 2 to the operation state, and the electric motor 3 to the stopped state.

In this case, the motive power from the output shaft 2a of the engine 2 is transmitted to the driving wheels 4 and 4 via the main clutch CM, the main input shaft 42, the sun gear 8s, the carrier 8c, the third sub input shaft 45, the first sub input shaft 43, the third speed gear pair 47, the output shaft 46, and the like. Thereby, only the motive power of the engine 2 rotates the driving wheels 4 and 4 in the advancing direction of the vehicle in the advancing state at the low speed stage. At this time, the sun gear 8s rotates in the forward direction along with the main input shaft 42 and therefore the rotor 3a rotates in the forward direction. Therefore, the regenerative mode is also available by causing the electric motor 3 to perform the regenerative operation so as to generate a torque in the direction causing the rotor 3a to rotate in the reverse direction.

[EV Mode, Low Speed Stage]

Figure 5:
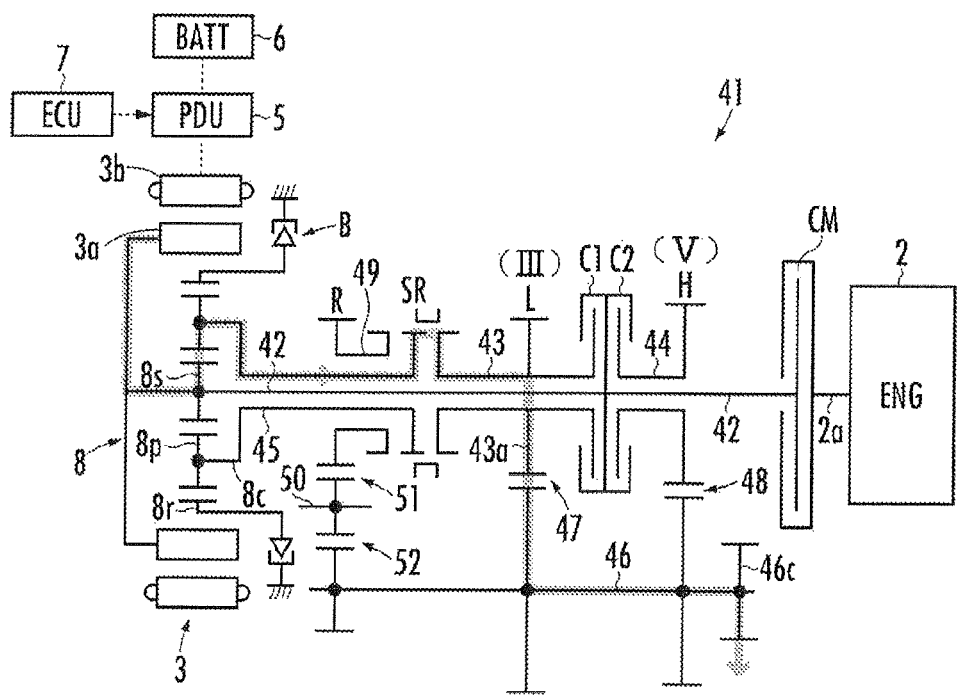
FIG. 5 is a diagram schematically illustrating the power transmission state of the power transmitting device for a hybrid vehicle according to the third embodiment at a low speed stage in an EV mode.

FIG. 5 illustrates the power transmission state of the power transmitting device 41 at the low speed stage in the EV mode. At the low speed stage in the EV mode, the ECU 7 sets the main clutch CM, the first clutch C1, and the second clutch C2 to the OFF state, the brake B to the lock state, the reverse synchronizer SR to the state where the sleeve is moved to the right side in the diagram, the engine 2 to the stopped state, and the electric motor 3 to the operation state where the rotor 3a rotates in the forward direction.

In this case, the motive power from the electric motor 3 is transmitted to the driving wheels 4 and 4 via the sun gear 8s, the carrier 8c, the third sub input shaft 45, the first sub input shaft 43, the third speed gear pair 47, the output shaft 46, and the like. Thereby, only the motive power of the electric motor 3 rotates the driving wheels 4 and 4 in the advancing direction of the vehicle in the advancing state at the low speed stage.

[Engine Mode, Third Speed Stage]

Figure 6:
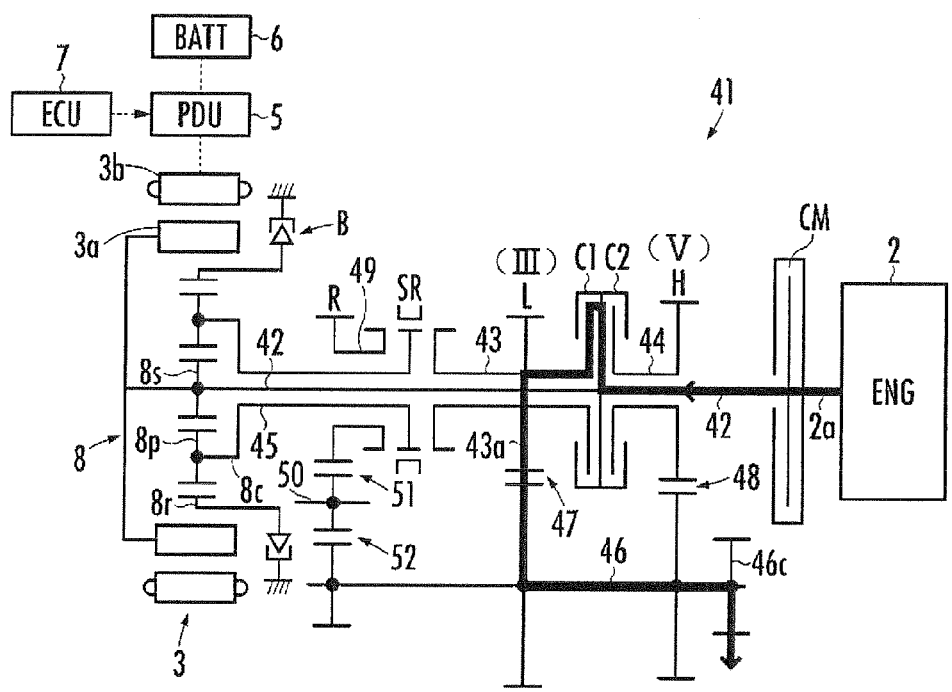
FIG. 6 is a diagram schematically illustrating the power transmission state of the power transmitting device for a hybrid vehicle according to the third embodiment at a third speed stage in the engine mode.

FIG. 6 illustrates the power transmission state of the power transmitting device 41 at the third speed stage in the engine mode. At the third speed stage in the engine mode, the ECU 7 sets the main clutch CM and the first clutch C1 to the ON state, the second clutch C2 to the OFF state, the brake B to the release state, the reverse synchronizer SR to the neutral state, the engine 2 to the operation state, and the electric motor 3 to the stopped state.

In this case, the motive power from the output shaft 2a of the engine 2 is transmitted to the driving wheels 4 and 4 via the main clutch CM, the main input shaft; 42, the first clutch C1, the first sub input shaft 43, the third speed gear pair 47, the output shaft 46, and the like. Thereby, only the motive power of the engine 2 rotates the driving wheels 4 and 4 in the advancing direction of the vehicle in the advancing state at the third speed stage. At this time, the sun gear 8s rotates in the forward direction along with the main input shaft 42 and therefore the rotor 3a rotates in the forward direction. Accordingly, the electric motor 3 generates a torque in the direction causing the rotor 3a to rotate in the reverse direction, which enables the regenerative mode in which the electric motor 3 performs the regenerative operation.

[EV Mode, Third Speed Stage]

Figure 7:
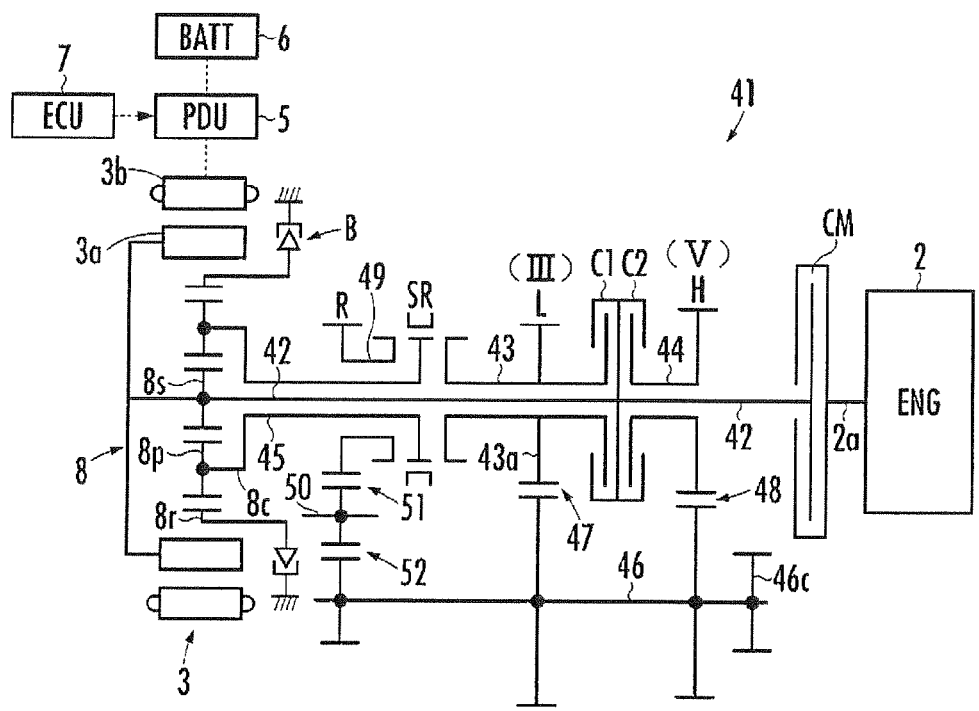
FIG. 7 is a diagram schematically illustrating the power transmission state of the power transmitting device for a hybrid vehicle according to the third embodiment at a third speed stage in the EV mode.

FIG. 7 illustrates the power transmission state of the power transmitting device 41 at the third speed stage in the EV mode. At the third speed stage in the EV mode, the ECU 7 sets the first clutch C1 to the ON state, the main clutch CM and the second clutch C2 to the OFF state, the brake B to the release state, the reverse synchronizer SR to the neutral state, the engine 2 to the stopped state, and the electric motor 3 to the operation state where the rotor 3a rotates in the forward direction.

In this case, the motive power from the electric motor 3 is transmitted to the driving wheels 4 and 4 via the sun gear 8s, the main input shaft 42, the first clutch C1, the first sub input shaft 43, the third speed gear pair 47, the output shaft 46, and the like. Thereby, only the motive power of the electric motor 3 rotates the driving wheels 4 and 4 in the advancing direction of the vehicle in the advancing state at the third speed stage.

[HEV Mode, Third Speed Stage (Pseudo Second Speed Stage)]

Figure 8:
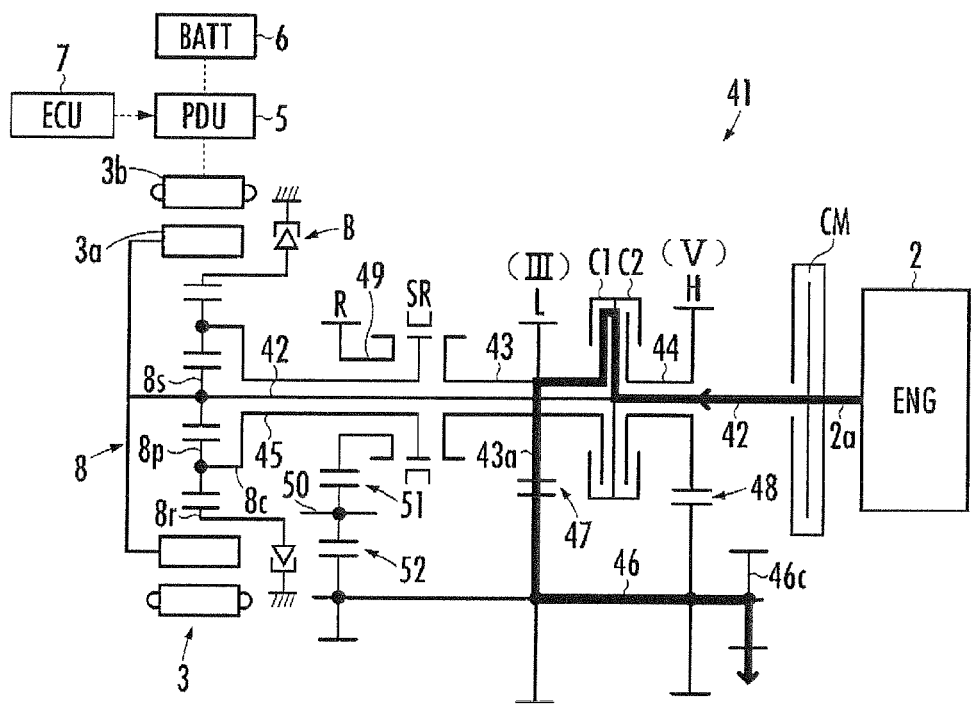
FIG. 8 is a diagram schematically illustrating the power transmission state of the power transmitting device for a hybrid vehicle according to the third embodiment at a third speed stage in an HEV mode.

FIG. 8 illustrates the power transmission state of the power transmitting device 41 at the third speed stage in the HEV mode. At the third speed stage in the HEV mode, the ECU 7 sets the main clutch CM and the first clutch C1 to the ON state, the second clutch C2 to the OFF state, the brake B to the release state, the reverse synchronizer SR to the neutral state, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. Therefore, the motive power from the engine 2 is combined with the motive power from the electric motor 3 at the sun gear 8s. Further, the combined motive power is transmitted to the driving wheels 4 and 4 via the main input shaft 42, the first clutch C1, the first sub input shaft 43, the third speed gear pair 47, the output shaft 46, and the like. Thereby, the motive power of the engine 2 and the electric motor 3 rotates the driving wheels 4 and 4 in the advancing direction of the vehicle in the advancing state at the third speed stage. At this time, the variable speed stage is the third speed stage. The motive power of the electric motor 3, however, is assisted and increased by the motive power of the engine 2, by which the variable speed stage acts as sort of a second speed stage.

[Engine Mode, Fifth Speed Stage]

Figure 9:
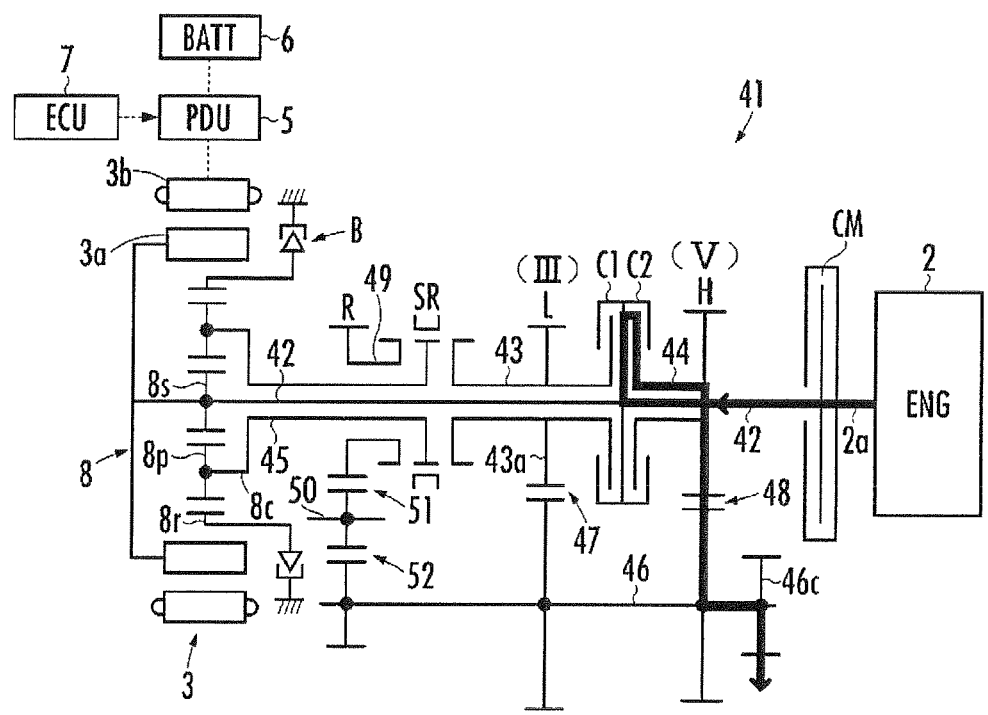
FIG. 9 is a diagram schematically illustrating the power transmission state of the power transmitting device for a hybrid vehicle according to the third embodiment at a fifth speed stage in the engine mode.

FIG. 9 illustrates the power transmission state of the power transmitting device 41 at the fifth speed stage in the engine mode. At the fifth speed stage in the engine mode, the ECU 7 sets the main clutch CM and the second clutch C2 to the ON state, the first clutch C1 to the OFF state, the brake B to the release state, the reverse synchronizer SR to the neutral state, the engine 2 to the operation state, and the electric motor 3 to the stopped state.

In this case, the motive power from the output shaft 2a of the engine 2 is transmitted to the driving wheels 4 and 4 via the main clutch CM, the main input shaft 42, the second clutch C2, the second sub input shaft 44, the fifth speed gear pair 48, the output shaft 46, and the like. Thereby, only the motive power of the engine 2 rotates the driving wheels 4 and 4 in the advancing direction of the vehicle in the advancing state at the fifth speed stage. At this time, the sun gear 8s rotates in the forward direction along with the main input shaft 42 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, Fifth Speed Stage]

Figure 10:
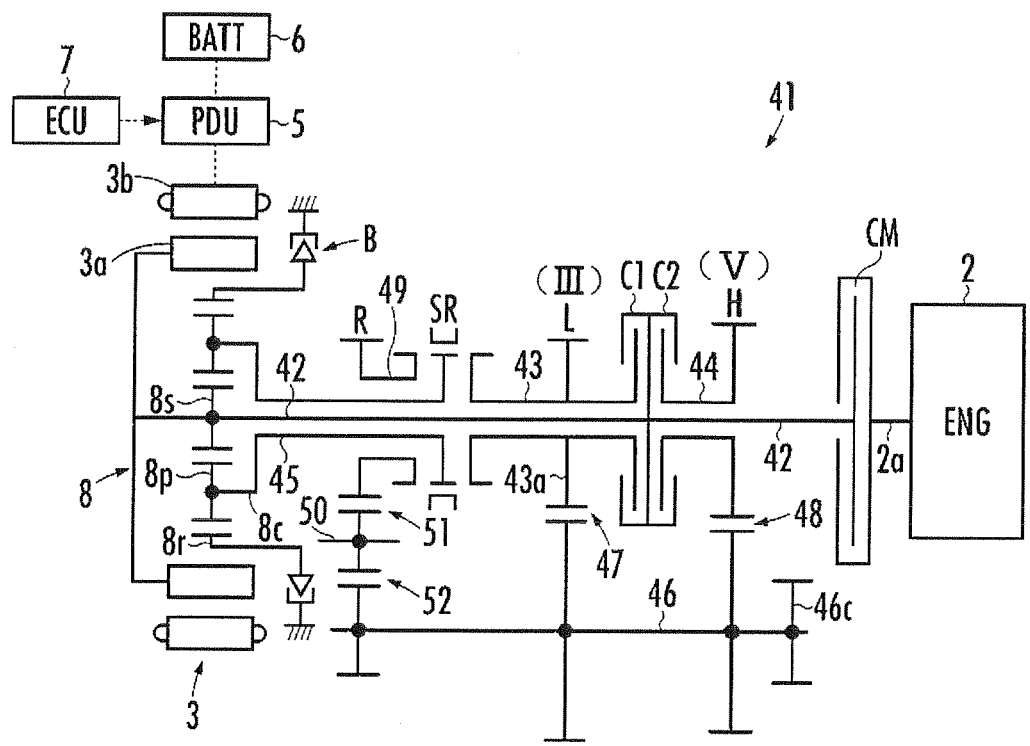
FIG. 10 is a diagram schematically illustrating the power transmission state of the power transmitting device for a hybrid vehicle according to the third embodiment at a fifth speed stage in the EV mode.

FIG. 10 illustrates the power transmission state of the power transmitting device 41 at the fifth speed stage in the EV mode. At the fifth speed stage in the EV mode, the ECU 7 sets the second clutch C2 to the ON state, the main clutch CM and the first clutch C1 to the OFF state, the brake B to the release state, the reverse synchronizer SR to the neutral state, the engine 2 to the stopped state, and the electric motor 3 to the operation state where the rotor 3a rotates in the forward direction.

In this case, the motive power from the electric motor 3 is transmitted to the driving wheels 4 and 4 via the sun gear 8s, the main input shaft 42, the second clutch C2, the second sub input shaft 44, the fifth speed gear pair 48, the output shaft 46, and the like. Thereby, only the motive power of the electric motor 3 rotates the driving wheels 4 and 4 in the advancing direction of the vehicle in the advancing state at the fifth speed stage.

[HEV Mode, Fifth Speed Stage (Pseudo Fourth Speed Stage)]

Figure 11:
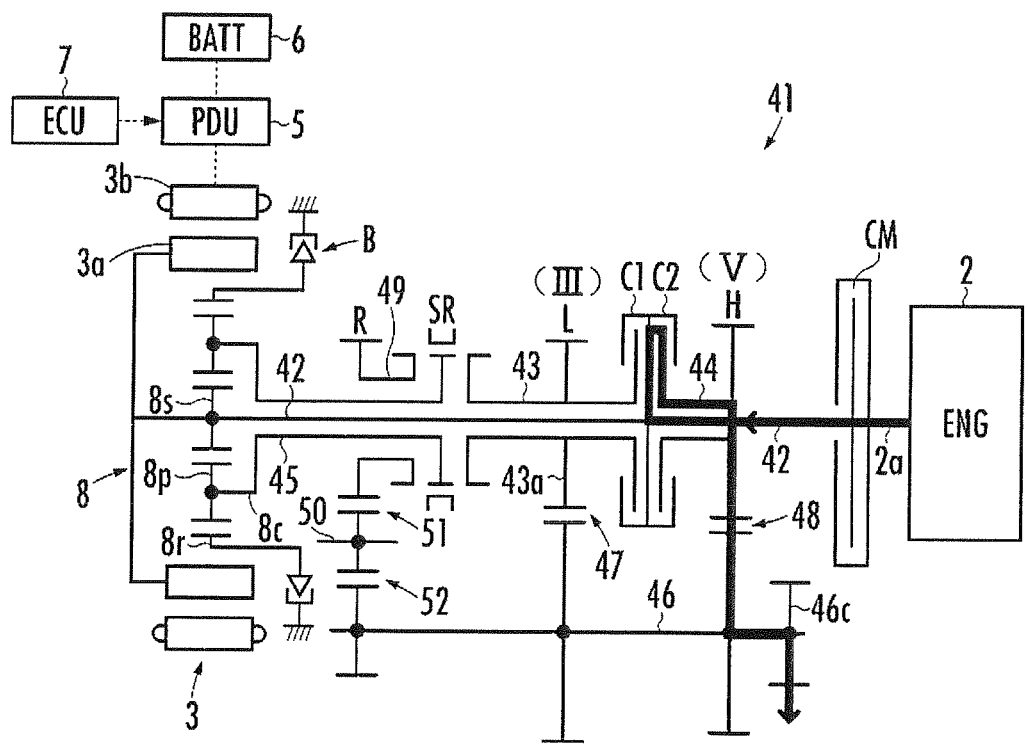
FIG. 11 is a diagram schematically illustrating the power transmission state of the power transmitting device for a hybrid vehicle according to the third embodiment at a fifth speed stage in the HEV mode.

FIG. 11 illustrates the power transmission state of the power transmitting device 41 at the fifth speed stage in the HEV mode. At the fifth speed stage in the HEV mode, the ECU 7 sets the main clutch CM and the second clutch C2 to the ON state, the first clutch C1 to the OFF state, the brake B to the release state, the reverse synchronizer SR to the neutral state, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. Therefore, the motive power from the engine 2 is combined with the motive power from the electric motor 3 at the sun gear 8s. Further, the combined motive power is transmitted to the driving wheels 4 and 4 via the main input shaft 42, the second clutch C2, the second sub input shaft 44, the fifth speed gear pair 48, the output shaft 46, and the like. Thereby, the motive power of the engine 2 and the electric motor 3 rotates the driving wheels 4 and 4 in the advancing direction of the vehicle in the advancing state at the fifth speed stage. At this time, the variable speed stage is the fifth speed stage. The motive power of the electric motor 3, however, is assisted and increased by the motive power of the engine 2, by which the variable speed stage acts as sort of a fourth speed stage.

[Engine Mode, Reverse Stage]

Figure 12:
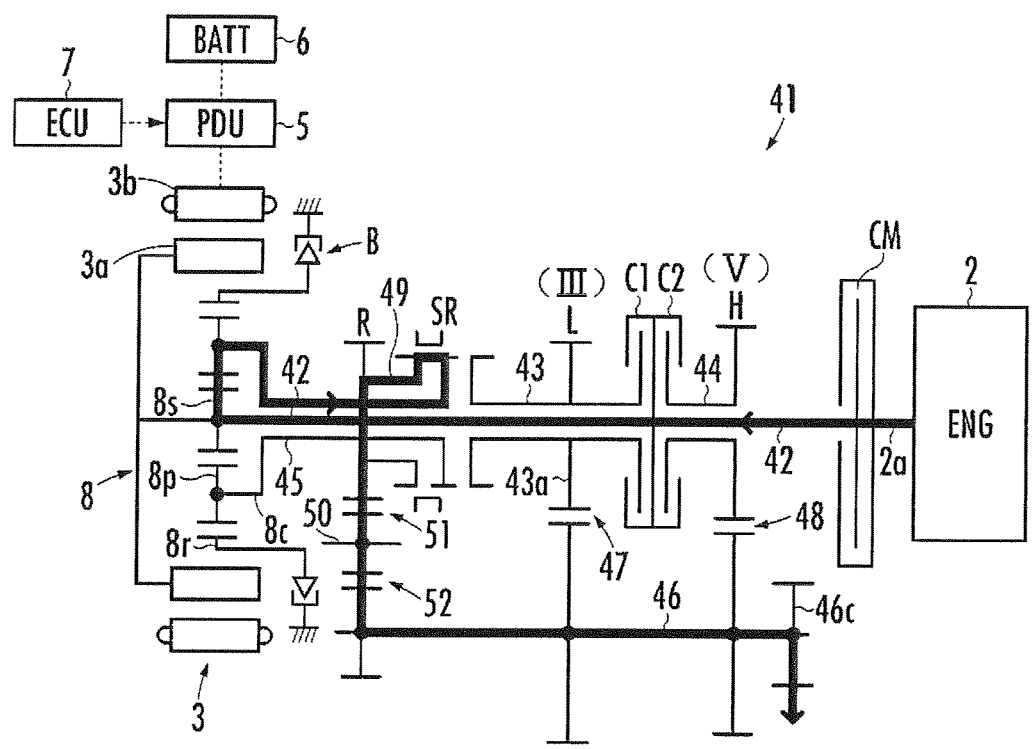
FIG. 12 is a diagram schematically illustrating the power transmission state of the power transmitting device for a hybrid vehicle according to the third embodiment at a reverse stage in the engine mode.

FIG. 12 illustrates the power transmission state of the power transmitting device 41 at the reverse stage in the engine mode. At the reverse stage in the engine mode, the ECU 7 sets the main clutch CM to the ON state, the first clutch C1 and the second clutch C2 to the OFF state, the brake B to the lock state, the reverse synchronizer SR to the state where the sleeve is moved to the left side in the diagram, the engine 2 to the operation state, and the electric motor 3 to the stopped state.

In this case, the motive power from the output shaft 2a of the engine 2 is transmitted to the driving wheels 4 and 4 via the main clutch CM, the main input shaft 42, the sun gear 8s, the carrier 8c, the third sub input shaft 45, the pairs of reverse gears 51 and 52, the output shaft 46, and the like. Thereby, only the motive power of the engine 2 rotates the driving wheels 4 and 4 in the backward direction of the vehicle. At this time, the sun gear 8s rotates in the forward direction along with the main input shaft 42 and therefore the rotor 3a rotates in the forward direction. Therefore, the regenerative mode is also available by causing the electric motor 3 to perform the regenerative operation so as to generate a torque in the direction causing the rotor 3a to rotate in the reverse direction.

[EV Mode, Reverse Stage]

Figure 13:
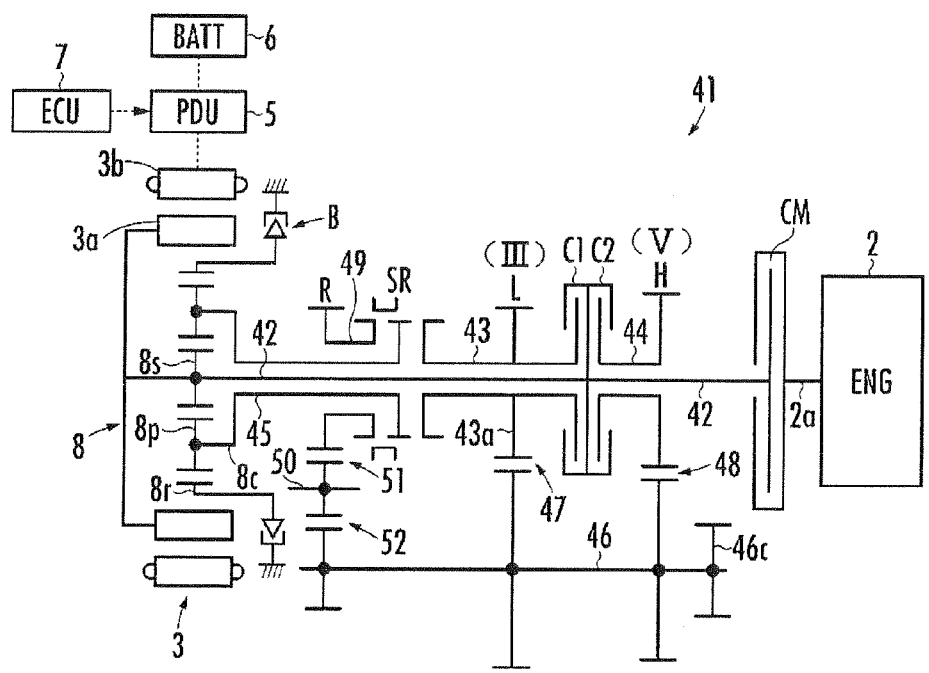
FIG. 13 is a diagram schematically illustrating the power transmission state of the power transmitting device for a hybrid vehicle according to the third embodiment at a reverse stage in the EV mode.

FIG. 13 illustrates the power transmission state of the power transmitting device 41 at the reverse stage in the EV mode. At the reverse stage in the EV mode, the ECU 7 sets the main clutch CM, the first clutch C1, and the second clutch C2 to the OFF state, the brake B to the lock state, the reverse synchronizer SR to the state where the sleeve is moved to the left side in the diagram, the engine 2 to the stopped state, and the electric motor 3 to the operation state where the rotor 3a rotates in the forward direction.

In this case, the motive power from the electric motor 3 is transmitted to the driving wheels 4 and 4 via the sun gear 8s, the carrier 8c, the third sub input shaft 45, the pairs of reverse gears 51 and 52, the output shaft 46, and the like. Thereby, only the motive power of the electric motor 3 rotates the driving wheels 4 and 4 in the backward direction of the vehicle.

Variation of Third Embodiment

Figure 14:
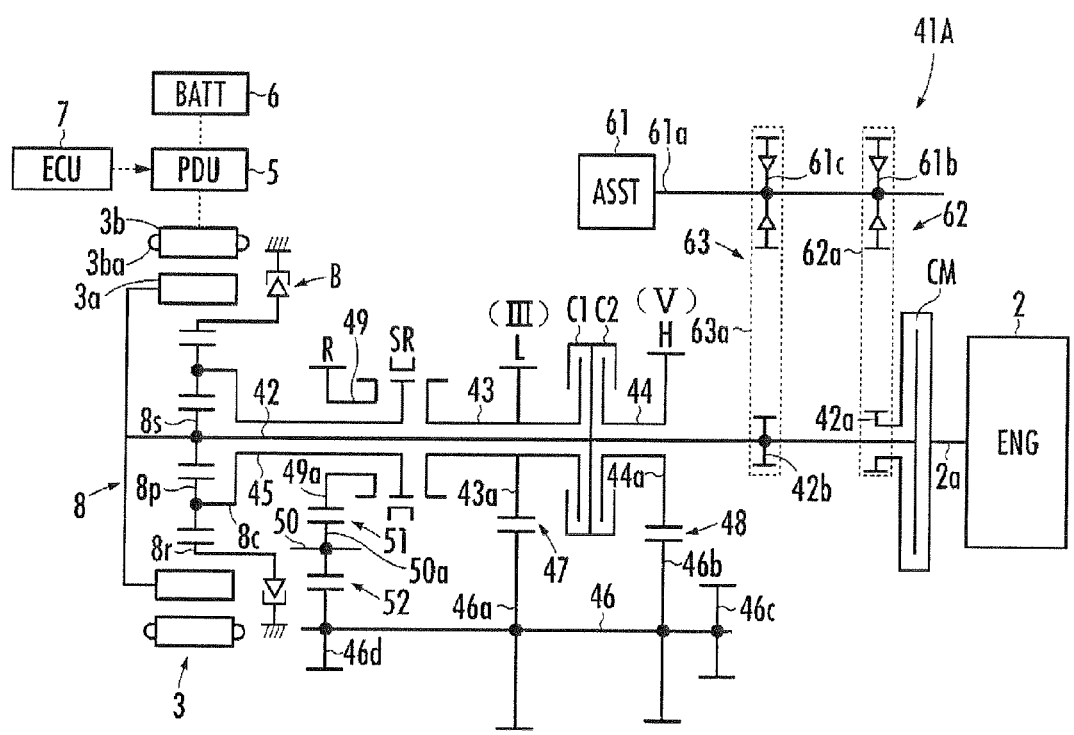
FIG. 14 is a diagram schematically illustrating the general configuration of a vehicle having a power transmitting device for a hybrid vehicle according to a variation of the third embodiment of the present invention.

A power transmitting device 41A for a hybrid vehicle according to a variation of the third embodiment of the present invention will be described with reference to FIG. 14. The counter shaft 17 and subsequent constituents are the same as those of FIG. 1 and therefore omitted in FIG. 14.

The power transmitting device 41A is similar to the power transmitting device 41, and therefore only the constituents different from those of the power transmitting device 41 are described below. In the power transmitting device 41, the auxiliary devices 53 and 56 are decentrally provided and are driven by input shafts 53a and 56a, which differ from each other, respectively. On the other hand, in the power transmitting device 41A, an auxiliary device 61 is intensively provided at one place and driven by a common input shaft 61.

For this reason, the power transmitting device 41A is provided with a gear 42b for driving the auxiliary device 61 in the main input shaft 42 so that the gear 42b is adjacent to the gear 42a. Specifically, the gear 42b is fixed onto the main input shaft 42 between the gear 42a and the second sub input shaft 44.

In addition, the main input shaft 42 is connected to an input shaft 61a of an auxiliary device 61 via a transmission mechanism 62. The transmission mechanism 62 is composed of a gear 42a and a gear 61b with a one-way clutch fixed onto the input shaft 61a, which are connected to each other via a belt 62a. Further, the main input shaft 42 is connected to the input shaft 61a of the auxiliary device 61 also via a transmission mechanism 63. The transmission mechanism 63 is composed of a gear 42b and a gear 61c with a one-way clutch fixed onto the input shaft 61a, which are connected to each other via a belt 63a. The torques transmitted via the belt 62a and 63a drive the auxiliary device 61, but do not drive the belt 62a and 63a due to the rotation of the input shaft 61a. The transmission mechanisms 62 and 63 may have a chain or the like, instead of the belts 62a and 63a.

Thereby, when the engine 2 is running even if the vehicle stops, the auxiliary device 61 is able to be driven via the gear 42a, the belt 62a, and the gear 61b with a one-way clutch. Moreover, even if the engine 2 stops, the auxiliary device 61 is able to be driven by operating the electric motor 3.

Further, running the engine 2 and setting the main clutch CM to the ON state in the stop state of the vehicle enables the battery 6 to be charged by the regenerative operation of the electric motor 3.

The operation modes and variable speed stages of the power transmitting device 41A are the same as those of the power transmitting device 41, and therefore the description thereof is omitted here.

Fourth Embodiment

Figure 15:
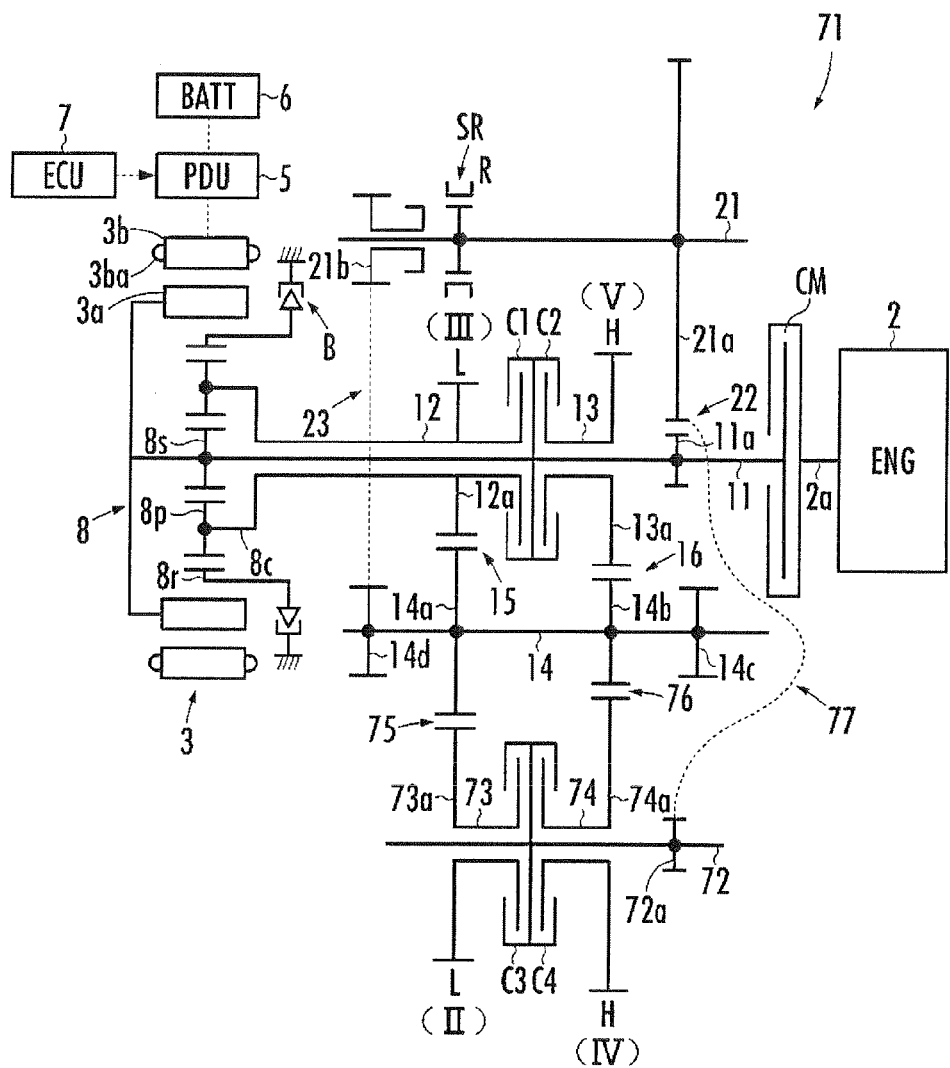
FIG. 15 is a diagram schematically illustrating the general configuration of a vehicle having a power transmitting device for a hybrid vehicle according to a fourth embodiment of the present invention.

A power transmitting device 71 for a hybrid vehicle according to a fourth embodiment of the present invention will be described with reference to FIG. 15. The power transmitting device 71 is similar to the power transmitting device 1, and therefore only the constituents different from those of the power transmitting device 1 are described below. The counter shaft 17 and subsequent constituents are the same as those of FIG. 1 and therefore omitted in FIG. 15.

In the power transmitting device 71, two forward speed stages are added only in the engine mode to the variable speed stages of the power transmitting device 1 that ensures the variable speed with three forward speed stages and one backward speed stage. The power transmitting device 71 has a third main input shaft 72, a third clutch C3, a fourth clutch C4, and the like in addition to the constituents of the power transmitting device 1.

The third main input shaft 72 is disposed parallel to the input transmission shaft 21. Further, the third main input shaft 72 and the input transmission shaft 21 are always connected to each other via a pair of gears 77. The pair of gears 77 is composed of a gear 72a fixed onto the third main input shaft 72 and a gear 21a fixed onto the input transmission shaft 21, which mesh with each other.

Two sub input shafts, namely a third sub input shaft 73 and a fourth sub input shaft 74 are disposed adjacent to each other and coaxially with the third main input shaft 72. Further, the third main input shaft 72 and the third sub input shaft 73 are connected to each other via the third clutch (a third make-and-break device) C3 or disposed in such a manner that motive power is transmittable between the third main input shaft 72 and the third sub input shaft 73 via the planetary gear 8p. Further, the third main input shaft 72 and the fourth sub input shaft 74 are connected to each other via a fourth clutch (a fourth make-and-break device) C4. The third clutch C3 and the fourth clutch C4 are disposed adjacent to each other and coaxially with the third main input shaft 72 therein.

The third clutch C3 is a clutch mechanism that operates in such a manner that the third main input shaft 72 is connected or disconnected to or from the third sub input shaft 73 under the control of the ECU 7. The fourth clutch C4 is a clutch mechanism that operates in such a manner that the third main input shaft 72 is connected or disconnected to or from the fourth sub input shaft 74 under the control of the ECU 7.

When the third clutch C3 is set to the connected state, the third sub input shaft 73 is connected to the third main input shaft 72. In this state, only the power transmission from the third main input shaft 72 to the third sub input shaft 73 is possible and the power transmission from the third main input shaft 72 to the fourth sub input shaft 74 is interrupted. Further, when the fourth clutch C4 is set to the connected state, the fourth sub input shaft 74 is connected to the third main input shaft 72. In this state, the power transmission from the third main input shaft 72 to the fourth sub input shaft 74 is possible and the power transmission from the third main input shaft 72 to the third sub input shaft 73 is interrupted. Note that both of the third clutch C3 and the fourth clutch C4 are not set to the connected state at a time and only one of the third clutch C3 and the fourth clutch C4 is selectively set to the connected state.

Further, the output shaft 14 and the third sub input shaft 73 are connected to each other via a second speed gear pair 75. The second speed gear pair 75 is composed of a low speed gear 14a fixed onto the output shaft 14 and a second speed gear 73a fixed onto the third sub input shaft 73, which mesh with each other. In addition, the output shaft 14 and the fourth sub input shaft 74 are connected to each other via a fourth speed gear pair 76. The fourth speed gear pair 76 is composed of a high speed gear 14b fixed onto the output shaft 14 and a fourth speed gear 74a fixed onto the fourth sub input shaft 74, which mesh with each other.

In the power transmitting device 71 having the above configuration, the motive power output from the output shaft 2a of the engine 2 is transmitted to the output shaft 14 through a power transmission path according to the states of the first to fourth clutches C1 to C4 when the main clutch CM is in the ON state. Specifically, when the third clutch C3 is in the ON state, the motive power is transmitted from the main input shaft 11 to the output shaft 14 via the pair of gears 22, the input transmission shaft 21, the pair of gears 77, the third main input shaft, and the second speed gear pair 75, by which the second speed stage is established. When the first clutch C1 is in the ON state, the motive power is transmitted from the main input shaft 11 to the output shaft 14 via the third speed gear pair 15, by which the third speed stage is established. When the fourth clutch C4 is in the ON state, the motive power is transmitted from the main input shaft 11 to the output shaft 14 via the pair of gears 22, the input transmission shaft 21, the pair of gears 77, the third main input shaft 72, and the fourth speed gear pair 76, by which the fourth speed stage is established. When the second clutch C2 is in the ON state, the motive power is transmitted from the main input shaft 11 to the output shaft 14 via the fifth speed gear pair 16, by which the fifth speed stage is established.

Further, when the main clutch CM is in the ON state, the motive power output from the output shaft 2a of the engine 2 is input from the sun gear 8s to the deceleration mechanism 8 via the main input shaft 11. Moreover, the motive power output from the electric motor 3 is also input from the sun gear 8s to the deceleration mechanism 8. In this manner, both of the motive power of the engine 2 and the motive power of the electric motor 3 are input to the sun gear 8s. Therefore, the motive power of the engine 2 and the motive power of the electric motor 3 are able to be input from the sun gear 8s to the deceleration mechanism 8 independently of whether any other motive power is present or of the direction thereof. Accordingly, the engine 2 is able to be started, for example, in the neutral condition where the vehicle is stopped with the electric motor 3 running.

Moreover, the brake B blocks the rotation of the ring gear 8r, by which motive power according to the motive power input to the sun gear 8s is output from the carrier 8c and transmitted to the output shaft 14 via the first sub input shaft 12 and the third speed gear pair 15. The motive power output from the deceleration mechanism 8 also assists the motive power transmitted from the engine 2 to the output shaft 14 without passing through the deceleration mechanism 8. In addition, the motive power is able to be output from the deceleration mechanism 8 only with the motive power of the electric motor 3 without the engine 2 driven. If the rotation direction of the sun gear 8s differs from the direction of the torque generated in the electric motor 3, the electric motor 3 performs the regenerative operation.

Particularly, if the main clutch CM and the first clutch C1 are set to the ON state and the brake B is set so as to block the rotation of the ring gear 8r, the motive power output from the engine 2 is transmitted from the main input shaft 11 to the output shaft 14 via the sub input shaft 12 so as to be transmitted directly from the third speed gear pair 15. Otherwise, the motive power output from the engine 2 is transmitted from the main input shaft 11 to the output shaft 14 via the sun gear 8s, the carrier 8c, and the sub input shaft 12 so as to be transmitted from the third speed gear pair in the reverse direction. At this time, a pseudo first speed stage having a reduction ratio higher than that of the second speed stage is able to be achieved. This enables the forward running with five speed stages in total, which includes the pseudo first speed stage, with only the engine 2 as a drive source.

Moreover, when the reverse synchronizer SR connects the reverse gear 21b to the input transmission shaft 21, the vehicle is able to move backward in the same manner as for the power transmitting device 1.

The operation modes of the power transmitting device 71 are the same as those of the power transmitting device 1 and therefore the description thereof is omitted here.

Fifth Embodiment

Figure 16:
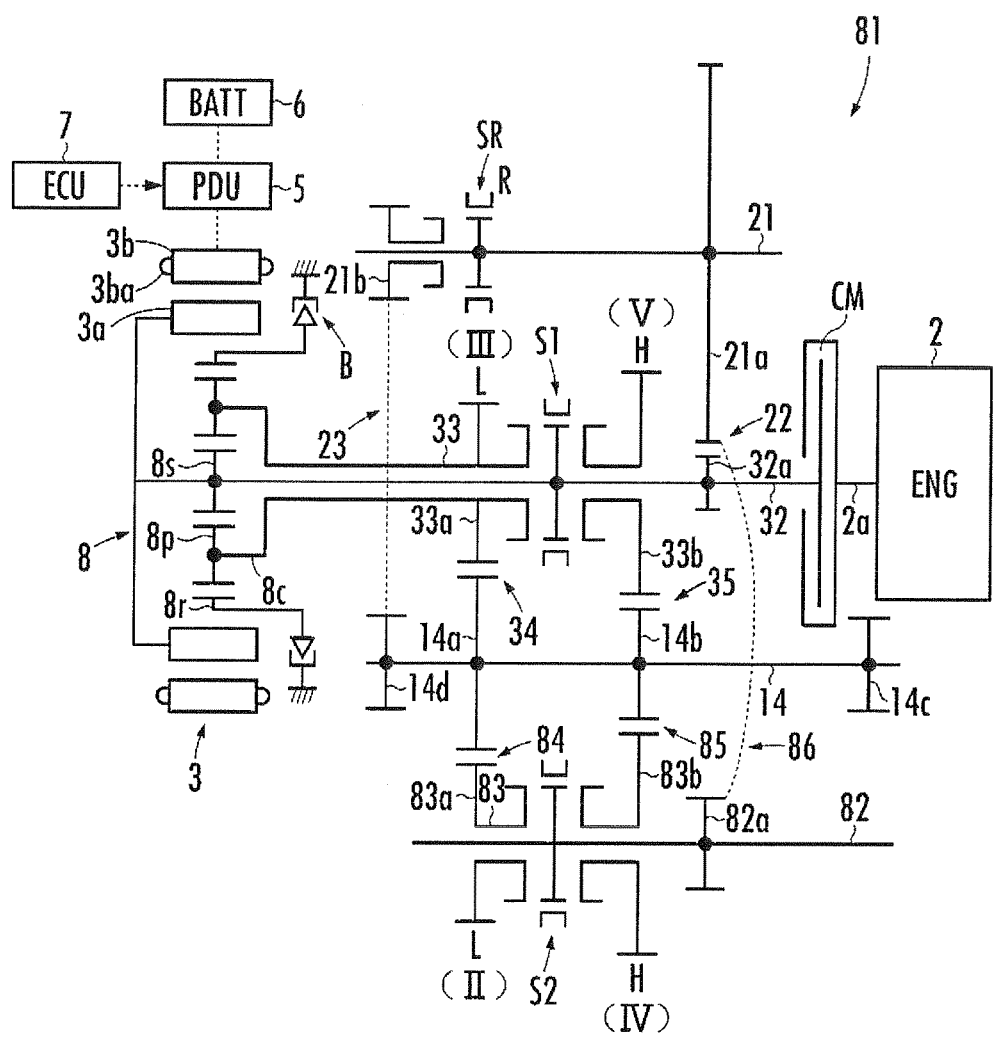
FIG. 16 is a diagram schematically illustrating the general configuration of a vehicle having a power transmitting device for a hybrid vehicle according to a fifth embodiment of the present invention.

A power transmitting device 81 for a hybrid vehicle according to a fifth embodiment of the present invention will be described with reference to FIG. 16. The power transmitting device 81 is similar to the power transmitting device 31, and therefore only different constituents are described below. The counter shaft 17 and subsequent constituents are the same as those of FIG. 1 and therefore omitted in FIG. 16.

In the power transmitting device 81, two forward speed stages are added only in the engine mode to the variable speed stages of the power transmitting device 31 that ensures the variable speed with three forward speed stages and one backward speed stage. The power transmitting device 81 has a third main input shaft 82, a second synchronizer S2, and the like in addition to the constituents of the power transmitting device 31.

The third main input shaft 82 is disposed parallel to the input transmission shaft 21. Further, the third main input shaft 82 and the input transmission shaft 21 are always connected to each other via a pair of gears 86. The pair of gears 86 is composed of a gear 82a fixed onto the third main input shaft 82 and a gear 21a fixed onto the input transmission shaft 21, which mesh with each other.

A third sub input shaft 83 is disposed coaxially with the third main input shaft 82. The third main input shaft 82 and the third sub input shaft 83 are connected to each other via the second synchronizer S2. The second synchronizer S2 is provided in the third sub input shaft 83 and is configured so as to be capable of switching between the connection and the disconnection of the second speed gear (a low speed gear) 83a or a fourth speed gear (a high speed gear) 83b and the third main input shaft 82.

The second synchronizer S2 is a well-known clutch such as a synchro clutch and selectively connects the second speed gear 83a or the fourth speed gear 83b to the third main input shaft 82 by moving the sleeve in the axial direction of the third sub input shaft 83 using an actuator and a shift fork, which are not illustrated. If the sleeve moves to the left side in the diagram, the second speed gear 83a is connected to the third main input shaft 82. On the other hand, if the sleeve moves to the right side in the diagram, the fourth speed gear 83b is connected to the third main input shaft 82.

Then, the output shaft 14 and the third sub input shaft 83 are connected to each other via a second speed gear pair 84 and the fourth speed gear pair 85. The second speed gear pair 84 is composed of a low speed gear 14a fixed onto the output shaft 14 and the second speed gear 83a, which mesh with each other. The fourth speed gear pair 85 is composed of a high speed gear 14b fixed onto the output shaft 14 and the fourth speed gear 83b, which mesh with each other.

The operation modes and variable speed stages of the power transmitting device 81 are similar to those of the power transmitting device 71 and therefore the description thereof is omitted here.

Sixth Embodiment

Figure 17:
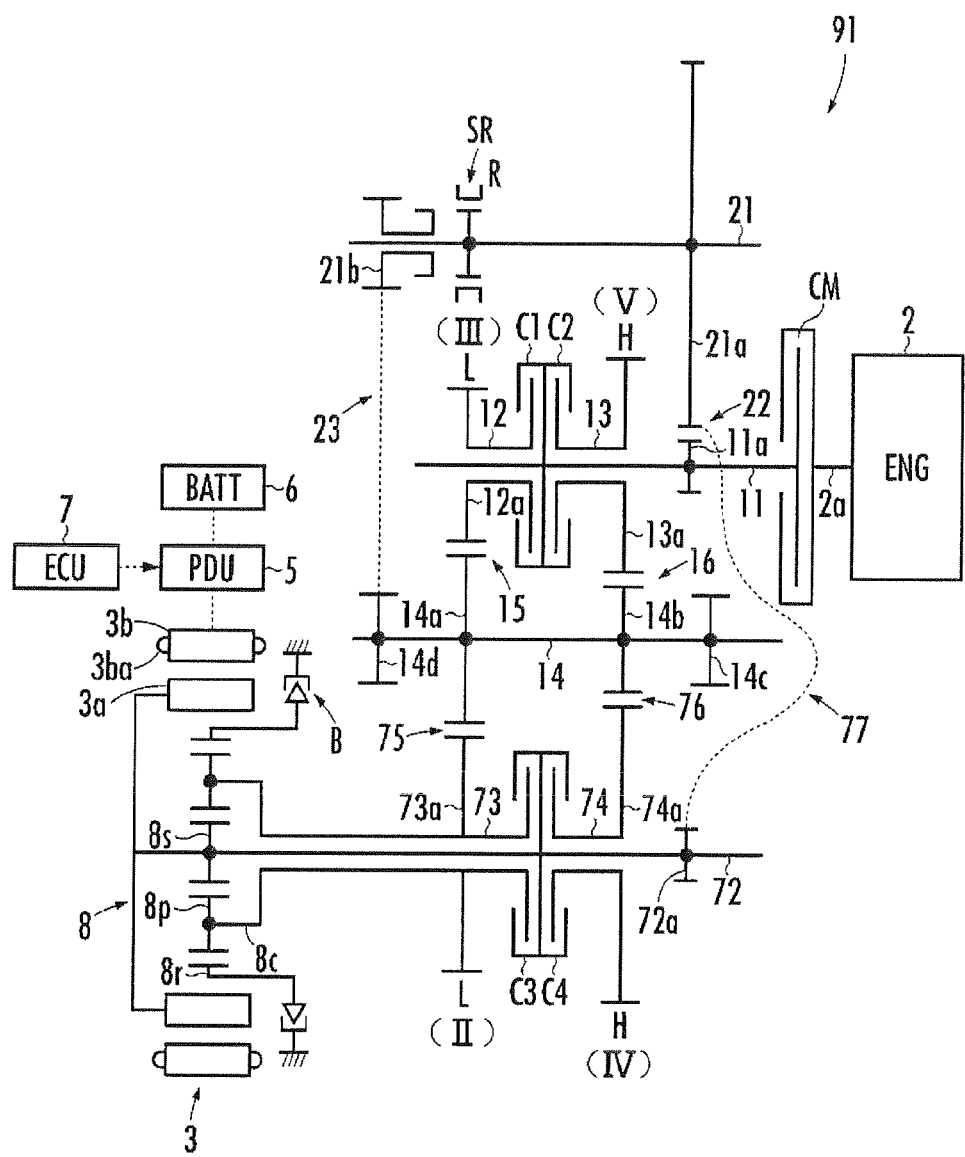
FIG. 17 is a diagram schematically illustrating the general configuration of a vehicle having a power transmitting device for a hybrid vehicle according to a sixth embodiment of the present invention.

A power transmitting device 91 for a hybrid vehicle according to a sixth embodiment of the present invention will be described with reference to FIG. 17. The power transmitting device 91 is similar to the power transmitting device 71, and therefore only different constituents are described below. The counter shaft 17 and subsequent constituents are the same as those of FIG. 1 and therefore omitted in FIG. 17.

In the power transmitting device 71, the sun gear 8s and the rotor 3a are fixed to one end of the main input shaft 11 and the carrier 8c is fixed to one end of the first sub input shaft 12. On the other hand, in the power transmitting device 91, the sun gear 8s and the rotor 3a are fixed to one end of the second main input shaft 72 and the carrier 8c is fixed to one end of the third sub input shaft 73.

Thereby, the power transmitting device 91 is able to perform the same operation as the operation of the power transmitting device 71. Further, the power transmitting device 91 allows the main input shaft 11 to be shorter than that of the power transmitting device 71, and therefore the shaft length of the entire power transmitting device 91 in the direction of the main input shaft 12 is able to be reduced.

Seventh Embodiment

Figure 18:
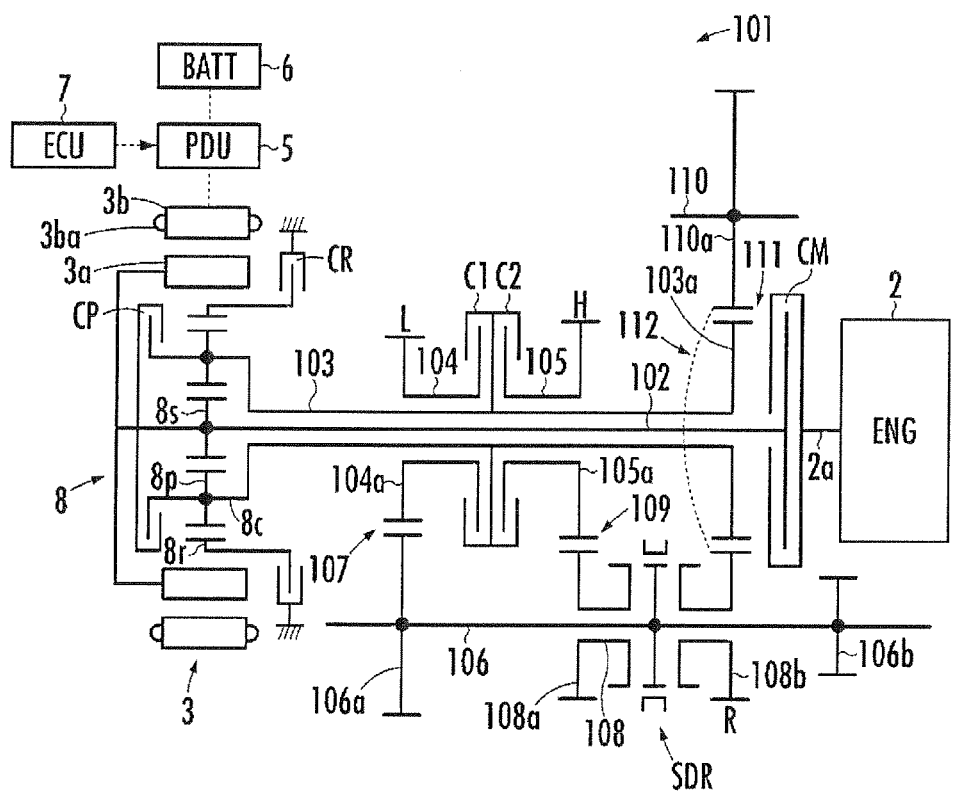
FIG. 18 is a diagram schematically illustrating the general configuration of a vehicle having a power transmitting device for a hybrid vehicle according to a seventh embodiment of the present invention.

A power transmitting device 101 for a hybrid vehicle according to a seventh embodiment of the present invention will be described below with reference to FIG. 18. The power transmitting device 101 is similar to the power transmitting device 1 and therefore only different constituents are described below. The counter shaft 17 and subsequent constituents are the same as those of FIG. 1 and therefore omitted in FIG. 18.

The output shaft 2a of the engine 2 is connected to a main input shaft (a first main input shaft) 102, which is disposed parallel to the output shaft 2a and to which the motive power from the engine 2 is input via the main clutch CM. The sun gear 8s is fixed to one end of the main input shaft 102 on the electric motor 3 side and the sun gear 8s rotates by interlocking with the main input shaft 102 and the rotor 3a.

An intermediate input shaft 103 is disposed coaxially with the main input shaft 102. The carrier 8c is fixed to one end of the intermediate input shaft 103 on the electric motor 3 side. The carrier 8c rotates by interlocking with the intermediate input shaft 103 and the planetary gear 8p.

The carrier 8c and the main input shaft 102 are connected to each other via a planetary clutch CP. The planetary clutch CP is a clutch mechanism that operates so that the carrier 8c is connected or disconnected to or from the main input shaft 102 under the control of the ECU 7. Setting the planetary clutch CP to the connected state connects the carrier 8c to the main input shaft 102 and rotates the sun gear 8s and the planetary gear 8p with the gears 8s and 8p relatively fixed.

In the ring gear 8r, a ring clutch CR is disposed. The ring clutch CR is a clutch mechanism that operates so that the ring gear 8r is connected or disconnected to or from the housing, which is an immovable part. Setting the ring clutch CR to the connected state blocks the rotation of the ring gear 8r. Note that, however, there may be used a brake or a synchromesh device capable of selectively switching between the state of blocking the rotation of the ring gear 8r in the both directions and the state of allowing the rotation in both directions, instead of the ring clutch CR.

Two sub shafts, namely a first sub input shaft 104 and a second sub input shaft 105 are disposed coaxially with the intermediate input shaft 103. Further, the intermediate input shaft 103 and the first sub input shaft 104 are connected to each other via a first clutch (a first make-and-break device) C1. Moreover, the intermediate input shaft 103 and the second sub input shaft 105 are connected to each other via a second clutch (a second make-and-break device) C2.

An output shaft 106 is disposed parallel to the main input shaft 102. Further, the output shaft 106 and the first sub input shaft 104 are connected to each other via a low speed gear pair 107. The low speed gear pair 107 is composed of a low speed gear (a driven gear) 106a fixed onto the output shaft 106 and a low speed gear (a drive gear) 104a fixed onto the first sub input shaft 104, which mesh with each other.

Moreover, a sub output shaft 108 is disposed coaxially with the output shaft 106. The output shaft 106 and the sub output shaft 108 are connected to each other via a synchronizer SDR. The synchronizer SDR is provided in the sub output shaft 108 and is configured so as to be capable of switching between the connection and the disconnection of a high speed gear (a driven gear) 108a or a reverse gear (a reverse driven gear) 108b and the output shaft 106.

The synchronizer SDR is a well-known clutch such as a synchro clutch and selectively connects the high speed gear 108a or the reverse gear 108b to the output shaft 106 by moving the sleeve in the axial direction of the sub output shaft 108 using an actuator and a shift fork, which are not illustrated. If the sleeve moves to the left side in the diagram, the high speed gear 108a is connected to the output shaft 106. On the other hand, if the sleeve moves to the right side in the diagram, the reverse gear 108b is connected to the output shaft 106.

Then, the sub output shaft 108 and the second sub input shaft 105 are connected to each other via a high speed gear pair 109. The high speed gear pair 109 is composed of the high speed gear 108a and a low speed gear (a drive gear) 105a fixed onto the second sub input shaft 105, which mesh with each other.

A reverse idler shaft 110 is disposed parallel to the intermediate input shaft 103. Further, the intermediate input shalt 103 and the reverse idler shaft 110 are connected to each other via a pair of reverse gears 111. The pair of reverse gears 111 is composed of a reverse gear (a reverse drive gear) 103a fixed onto the intermediate input shalt 103 and a reverse gear (a reverse intermediate gear) 110a fixed onto the reverse idler shaft 110, which mesh with each other. Then, the sub output shaft 108 and the reverse idler shaft 110 are connected to each other via a pair of reverse gears 112. The pair of reverse gears 112 is composed of the reverse gear 108b and the reverse gear 110a, which mesh with each other.

Further, a final gear 106b, which meshes with the final gear 14c fixed onto the output shaft 14, is fixed onto the output shaft 106.

Hereinafter, the variable speed stage in the operation mode of the power transmitting device 101 will be described. The power transmitting device 101 ensures four forward speed stages and one backward speed stage in each of the three operation modes, the engine mode, the EV mode, and the HEV mode.

[Engine Mode, First Speed Stage]

Figure 19:
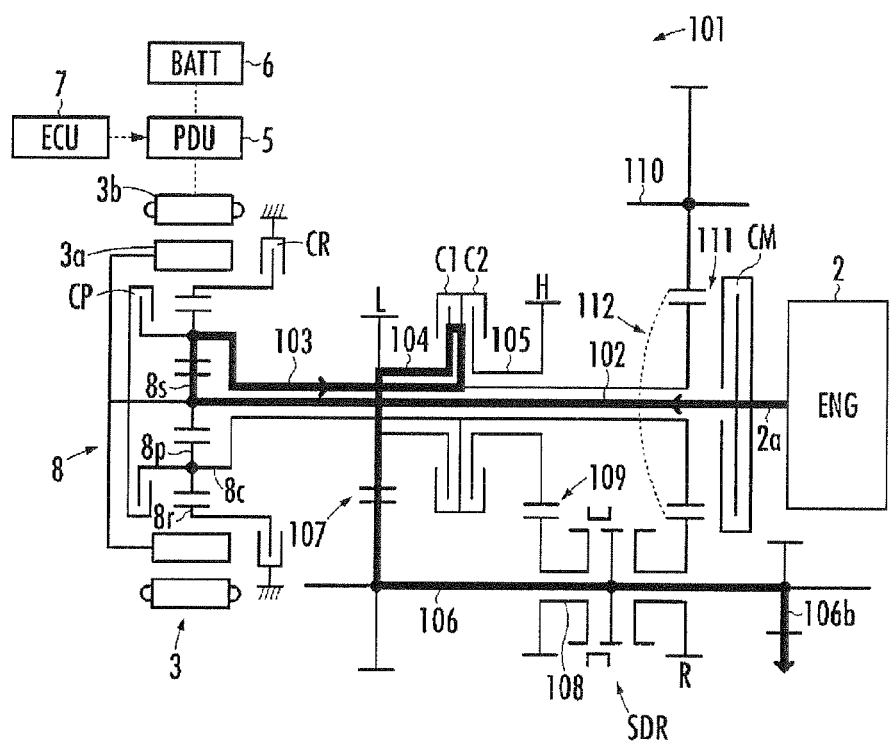
FIG. 19 is a diagram schematically illustrating the power transmission state of the power transmitting device for a hybrid vehicle according to the seventh embodiment at a first speed stage in an engine mode.

FIG. 19 illustrates the power transmission state of the power transmitting device 101 at the first speed stage in the engine mode. At the first speed stage in the engine mode, the ECU 7 sets the main clutch CM, the ring clutch CR, and the first clutch C1 to the ON state, the planetary clutch CP and the second clutch C2 to the OFF state, the synchronizer SDR to the state where the sleeve is moved to the left side in the diagram, the engine 2 to the operation state, and the electric motor 3 to the stopped state.

In this case, the motive power from the output shaft 2a of the engine 2 is input to the sun gear 8s via the main clutch CM and the main input shaft 102. Further, the motive power is decelerated by the deceleration mechanism 8 and output from the carrier 8c, and then transmitted to the driving wheels 4 and 4 via the intermediate input shaft 103, the first clutch C1, the first sub input shaft 104, the low speed gear pair 107, the output shaft 106, and the like. Thereby, only the motive power of the engine 2 rotates the driving wheels 4 and 4 in the advancing direction of the vehicle in the advancing state at the first speed stage. At this time, the sun gear 8s rotates in the forward direction along with the main input shaft 106 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, First Speed Stage]

Figure 20:
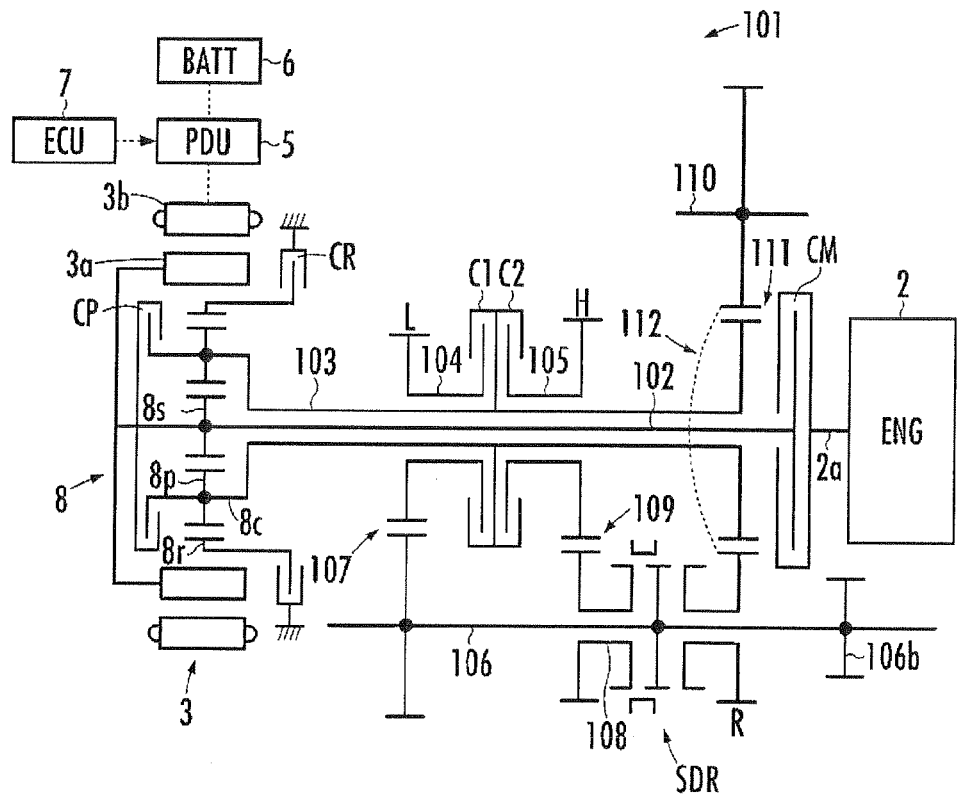
FIG. 20 is a diagram schematically illustrating the power transmission state of the power transmitting device for a hybrid vehicle according to the seventh embodiment at a first speed stage in an EV mode.

FIG. 20 illustrates the power transmission state of the power transmitting device 101 at the first speed stage in the EV mode. At the first speed stage in the EV mode, the ECU 7 sets the ring clutch CR and the first clutch C1 to the ON state, the main clutch CM, the planetary clutch CP, and the second clutch C2 to the OFF state, the synchronizer SDR to the state where the sleeve is moved to the left side in the diagram, the engine 2 to the stopped state, and the electric motor 3 to the operation state where the rotor 3a rotates in the forward direction.

In this case, the motive power from the electric motor 3 is input to the sun gear 8s. Further, the motive power is decelerated by the deceleration mechanism 8 and output from the carrier 8c, and then transmitted to the driving wheels 4 and 4 via the intermediate input shaft 103, the first clutch C1, the first sub input shaft 104, the low speed gear pair 107, the output shaft 106, and the like. Thereby, only the motive power of the electric motor 3 rotates the driving wheels 4 and 4 in the advancing direction of the vehicle in the advancing state at the first speed stage.

[HEV Mode, First Speed Stage]

Figure 21:
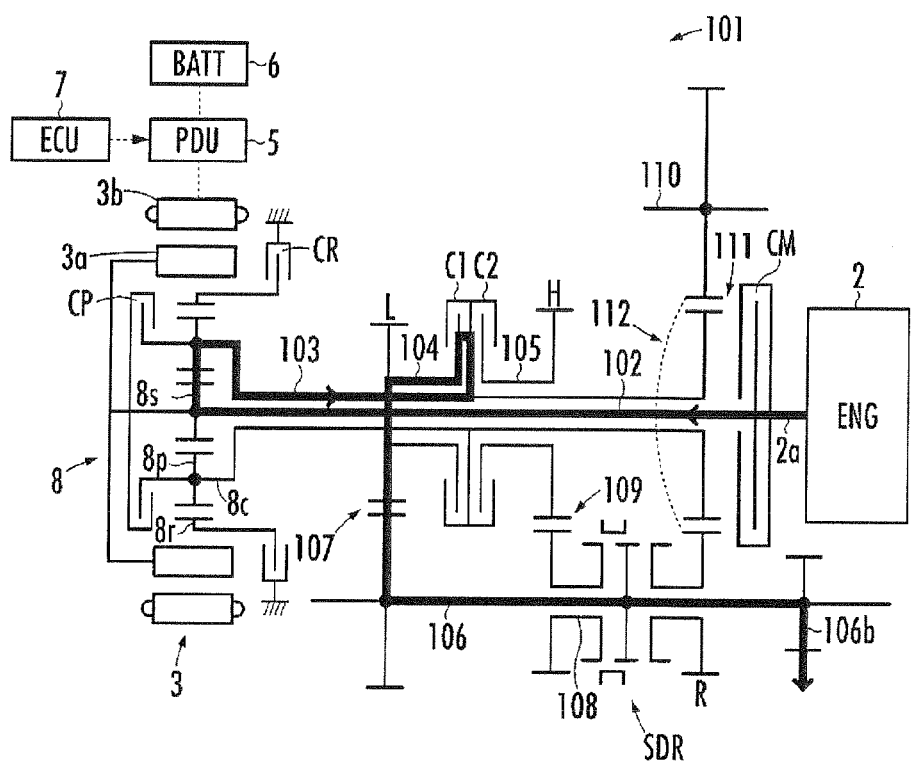
FIG. 21 is a diagram schematically illustrating the power transmission state of the power transmitting device for a hybrid vehicle according to the seventh embodiment at a first speed stage in an HEV mode.

FIG. 21 illustrates the power transmission state of the power transmitting device 101 at the first speed stage in the HEV mode. At the first speed stage in the HEV mode, the ECU 7 sets the main clutch CM, the ring clutch CR, and the first clutch C1 to the ON state, the planetary clutch CP and the second clutch C2 to the OFF state, the synchronizer SDR to the state where the sleeve is moved to the left side in the diagram, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. These motive powers input to the sun gear 8s are decelerated by the deceleration mechanism 8 and output from the carrier 8c, and then transmitted to the driving wheels 4 and 4 via the intermediate input shaft 103, the first clutch C1, the first sub input shaft 104, the low speed gear pair 107, the output shaft 106, and the like. Thereby, the motive power of the engine 2 and the motive power of the electric motor 3 rotate the driving wheels 4 and 4 in the advancing direction of the vehicle in the advancing state at the first speed stage.

[Engine Mode, Second Speed Stage]

Figure 22:
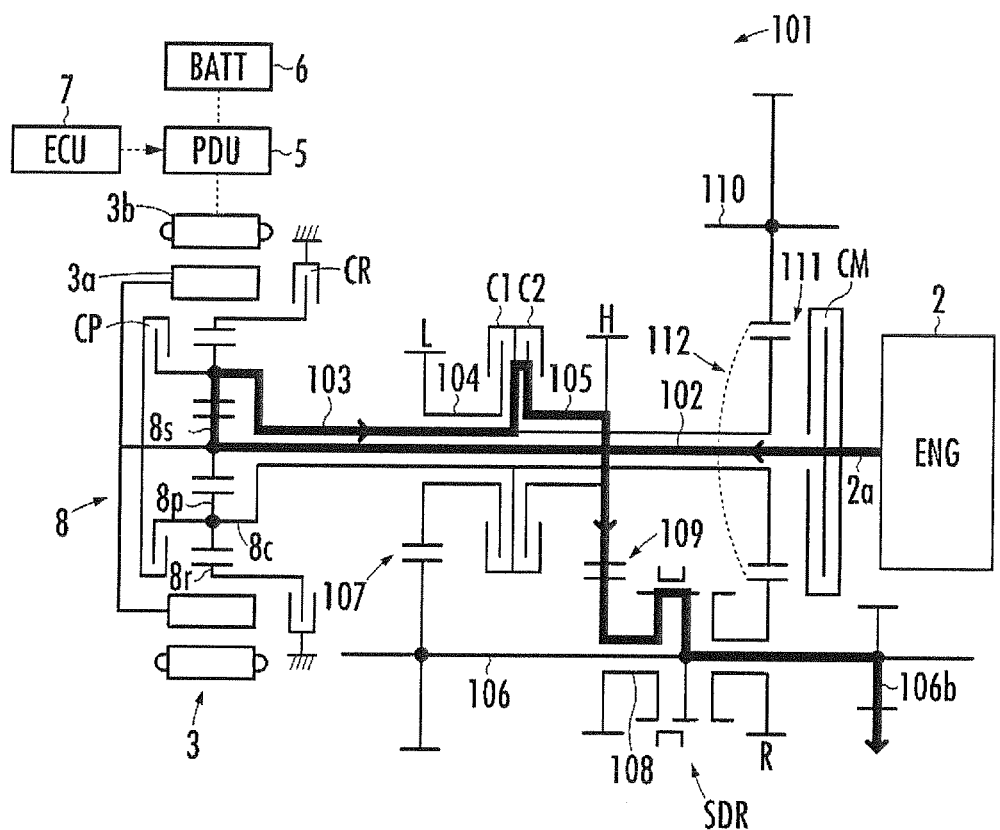
FIG. 22 is a diagram schematically illustrating the power transmission state of the power transmitting device for a hybrid vehicle according to the seventh embodiment at a second speed stage in the engine mode.

FIG. 22 illustrates the power transmission state of the power transmitting device 101 at the second speed stage in the engine mode. At the second speed stage in the engine mode, the ECU 7 sets the main clutch CM, the ring clutch CR, and the second clutch C2 to the ON state, the planetary clutch CP and the first clutch C1 to the OFF state, the synchronizer SDR to the state where the sleeve is moved to the left side in the diagram, the engine 2 to the operation state, and the electric motor 3 to the stopped state.

In this case, the motive power from the output shaft 2a of the engine 2 is input to the sun gear 8s via the main clutch CM and the main input shaft 102. Further, the motive power is decelerated by the deceleration mechanism 8 and output from the carrier 8c, and then transmitted to the driving wheels 4 and 4 via the intermediate input shaft 103, the second clutch C2, the second sub input shaft 105, the high speed gear pair 109, the sub output shaft 108, the output shaft 106, and the like. Thereby, only the motive power of the engine 2 rotates the driving wheels 4 and 4 in the advancing direction of the vehicle in the advancing state at the second speed stage. At this time, the sun gear 8s rotates in the forward direction along with the main input shaft 106 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, Second Speed Stage]

Figure 23:
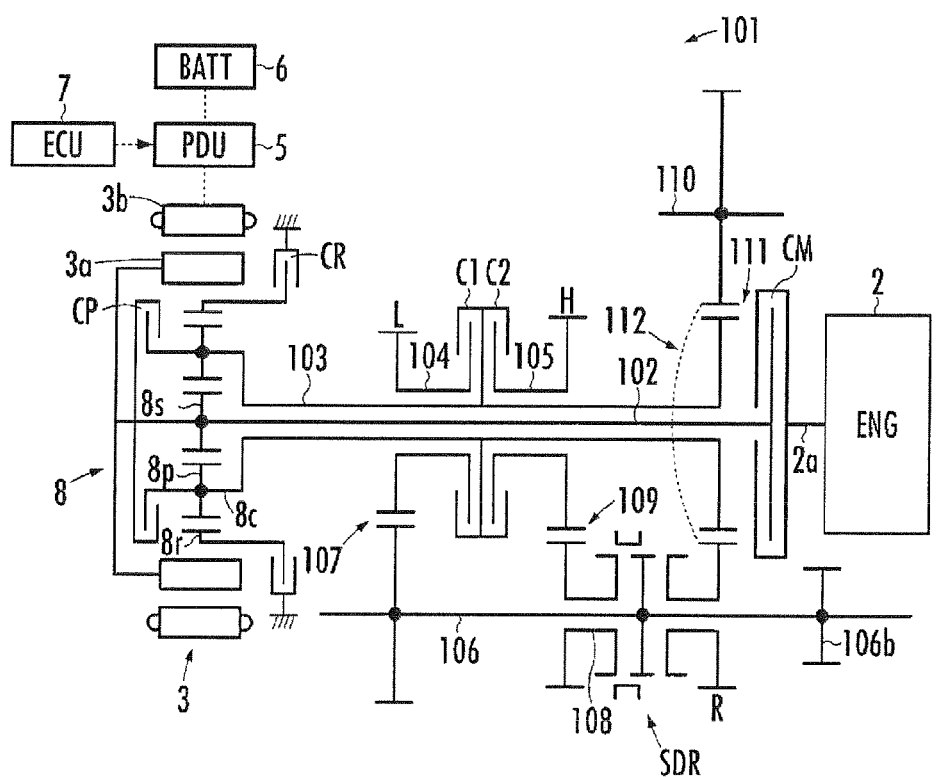
FIG. 23 is a diagram schematically illustrating the power transmission state of the power transmitting device for a hybrid vehicle according to the seventh embodiment at a second speed stage in the EV mode.

FIG. 23 illustrates the power transmission state of the power transmitting device 101 at the second speed stage in the EV mode. At the second speed stage in the EV mode, the ECU 7 sets the ring clutch CR and the second clutch C2 to the ON state, the main clutch CM, the planetary clutch CP, and the first clutch C1 to the OFF state, the synchronizer SDR to the state where the sleeve is moved to the left side in the diagram, the engine 2 to the stopped state, and the electric motor 3 to the operation state where the rotor 3a rotates in the forward direction.

In this case, the motive power from the electric motor 3 is input to the sun gear 8s. Further, the motive power is decelerated by the deceleration mechanism 8 and output from the carrier 8c, and then transmitted to the driving wheels 4 and 4 via the intermediate input shaft 103, the second clutch C2, the second sub input shaft 105, the high speed gear pair 109, the sub output shaft 108, the output shaft 106, and the like. Thereby, only the motive power of the electric motor 3 rotates the driving wheels 4 and 4 in the advancing direction of the vehicle in the advancing state at the second speed stage.

[HEV Mode, Second Speed Stage]

Figure 24:
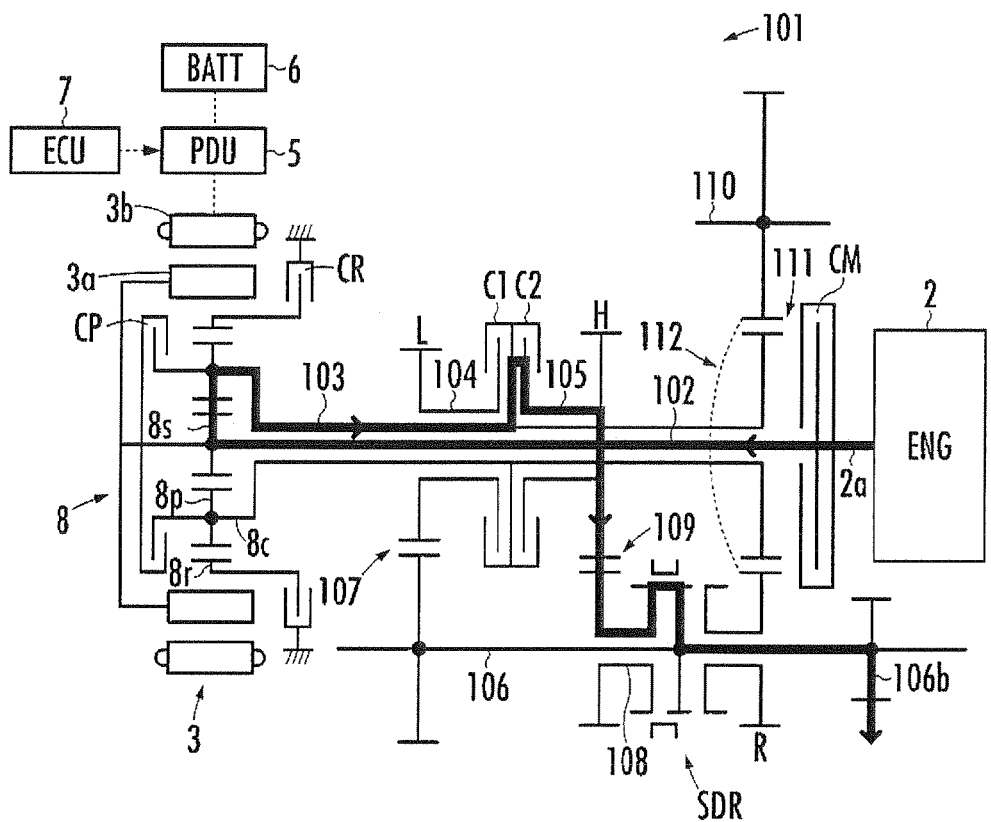
FIG. 24 is a diagram schematically illustrating the power transmission state of the power transmitting device for a hybrid vehicle according to the seventh embodiment at a second speed stage in the HEV mode.

FIG. 24 illustrates the power transmission state of the power transmitting device 101 at the second speed stage in the HEV mode. At the second speed stage in the HEV mode, the ECU 7 sets the main clutch CM, the ring clutch CR, and the second clutch C2 to the ON state, the planetary clutch CP and the first clutch C1 to the OFF state, the synchronizer SDR to the state where the sleeve is moved to the left side in the diagram, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. These motive powers input to the sun gear 8s are decelerated by the deceleration mechanism 8 and output from the carrier 8c, and then transmitted to the driving wheels 4 and 4 via the intermediate input shaft 103, the second clutch C2, the second sub input shaft 105, the high speed gear pair 109, the sub output shaft 108, the output shaft 106, and the like. Thereby, the motive power of the engine 2 and the motive power of the electric motor 3 rotate the driving wheels 4 and 4 in the advancing direction of the vehicle in the advancing state at the second speed stage.

[Engine Mode, Third Speed Stage]

Figure 25:
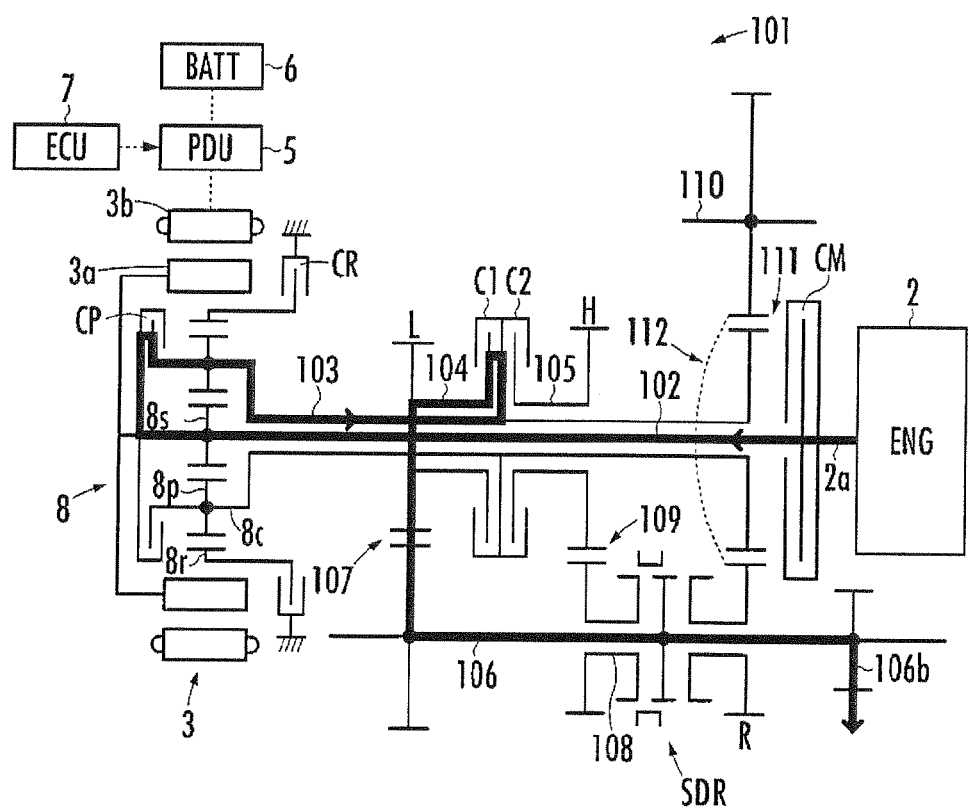
FIG. 25 is a diagram schematically illustrating the power transmission state of the power transmitting device for a hybrid vehicle according to the seventh embodiment at a third speed stage in the engine mode.

FIG. 25 illustrates the power transmission state of the power transmitting device 101 at the third speed stage in the engine mode. At the third speed stage in the engine mode, the ECU 7 sets the main clutch CM, the planetary clutch CP, and the first clutch C1 to the ON state, the ring clutch CR and the second clutch C2 to the OFF state, the synchronizer SDR to the state where the sleeve is moved to the left side in the diagram, the engine 2 to the operation state, and the electric motor 3 to the stopped state.

In this case, the motive power from the output shaft 2a of the engine 2 is input to the sun gear 8s via the main clutch CM and the main input shaft 102. Further, the motive power is output from the carrier 8c, which interlocks with the sun gear 8s, and then transmitted to the driving wheels 4 and 4 via the intermediate input shaft 103, the first clutch C1, the first sub input shaft 104, the low speed gear pair 107, the output shaft 106, and the like. Thereby, only the motive power of the engine 2 rotates the driving wheels 4 and 4 in the advancing direction of the vehicle in the advancing state at the third speed stage. At this time, the sun gear 8s rotates in the forward direction along with the main input shaft 106 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, Third Speed Stage]

Figure 26:
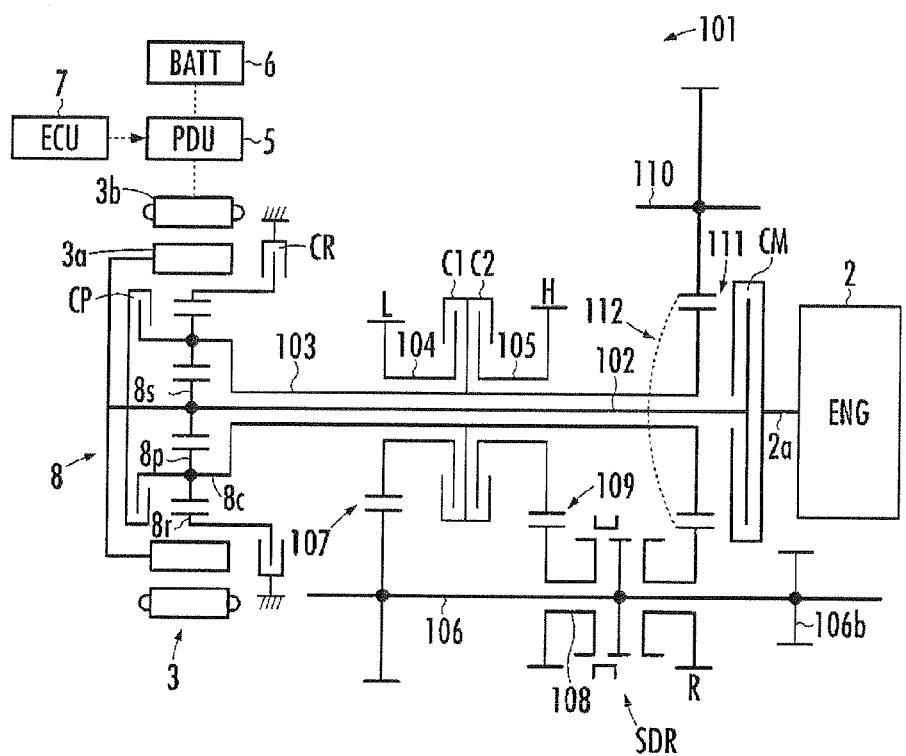
FIG. 26 is a diagram schematically illustrating the power transmission state of the power transmitting device for a hybrid vehicle according to the seventh embodiment at a third speed stage in the EV mode.

FIG. 26 illustrates the power transmission state of the power transmitting device 101 at the third speed stage in the EV mode. At the third speed stage in the EV mode, the ECU 7 sets the planetary clutch CP and the first clutch C1 to the ON state, the main clutch CM, the ring clutch CR, and the second clutch C2 to the OFF state, the synchronizer SDR to the state where the sleeve is moved to the left side in the diagram, the engine 2 to the stopped state, and the electric motor 3 to the operation state where the rotor 3a rotates in the forward direction.

In this case, the motive power from the electric motor 3 is input to the sun gear 8s. Further, the motive power is output from the carrier 8c, which interlocks with the sun gear 8s, and then transmitted to the driving wheels 4 and 4 via the intermediate input shaft 103, the first clutch C1, the first sub input shaft 104, the low speed gear pair 107, the output shaft 106, and the like. Thereby, only the motive power of the electric motor 3 rotates the driving wheels 4 and 4 in the advancing direction of the vehicle in the advancing state at the third speed stage.

[HEV Mode, Third Speed Stage]

Figure 27:
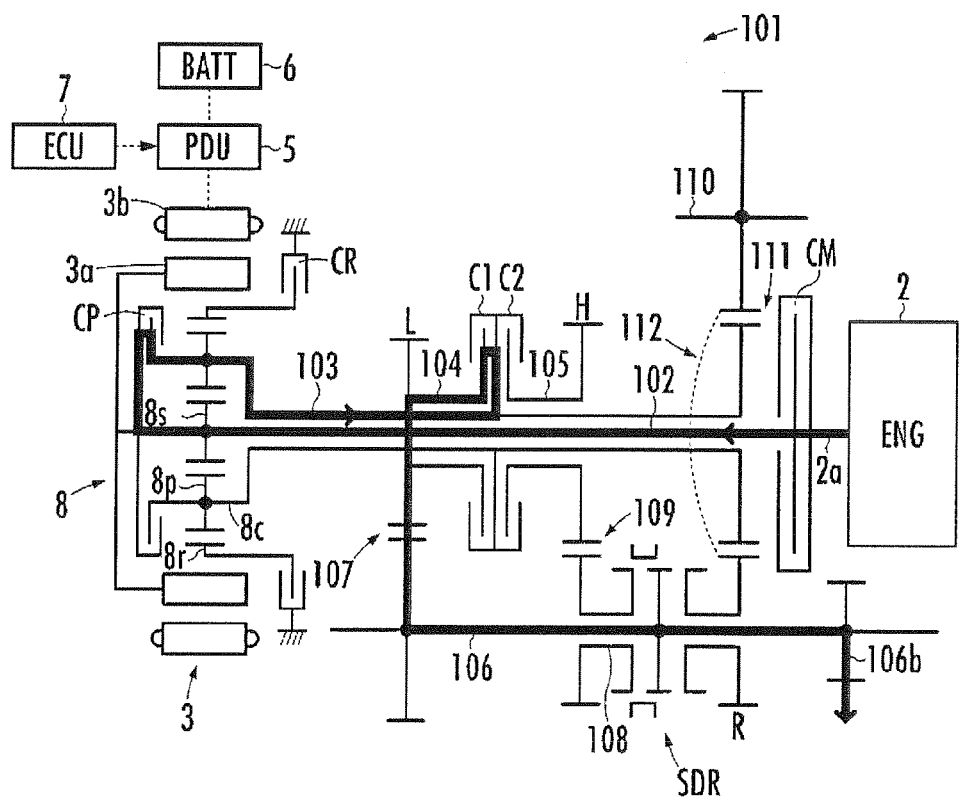
FIG. 27 is a diagram schematically illustrating the power transmission state of the power transmitting device for a hybrid vehicle according to the seventh embodiment at a third speed stage in the HEV mode.

FIG. 27 illustrates the power transmission state of the power transmitting device 101 at the third speed stage in the HEV mode. At the third speed stage in the HEV mode, the ECU 7 sets the main clutch CM, the planetary clutch CP, and the first clutch C1 to the ON state, the ring clutch CR and the second clutch C2 to the OFF state, the synchronizer SDR to the state where the sleeve is moved to the left side in the diagram, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. These motive powers input to the sun gear 8s are output from the carrier 8c, which interlocks with the sun gear 8s, and then transmitted to the driving wheels 4 and 4 via the intermediate input shaft 103, the first clutch C1, the first sub input shaft 104, the low speed gear pair 107, the output shaft 106, and the like. Thereby, the motive power of the engine 2 and the motive power of the electric motor 3 rotate the driving wheels 4 and 4 in the advancing direction of the vehicle in the advancing state at the third speed stage.

[Engine Mode, Fourth Speed Stage]

Figure 28:
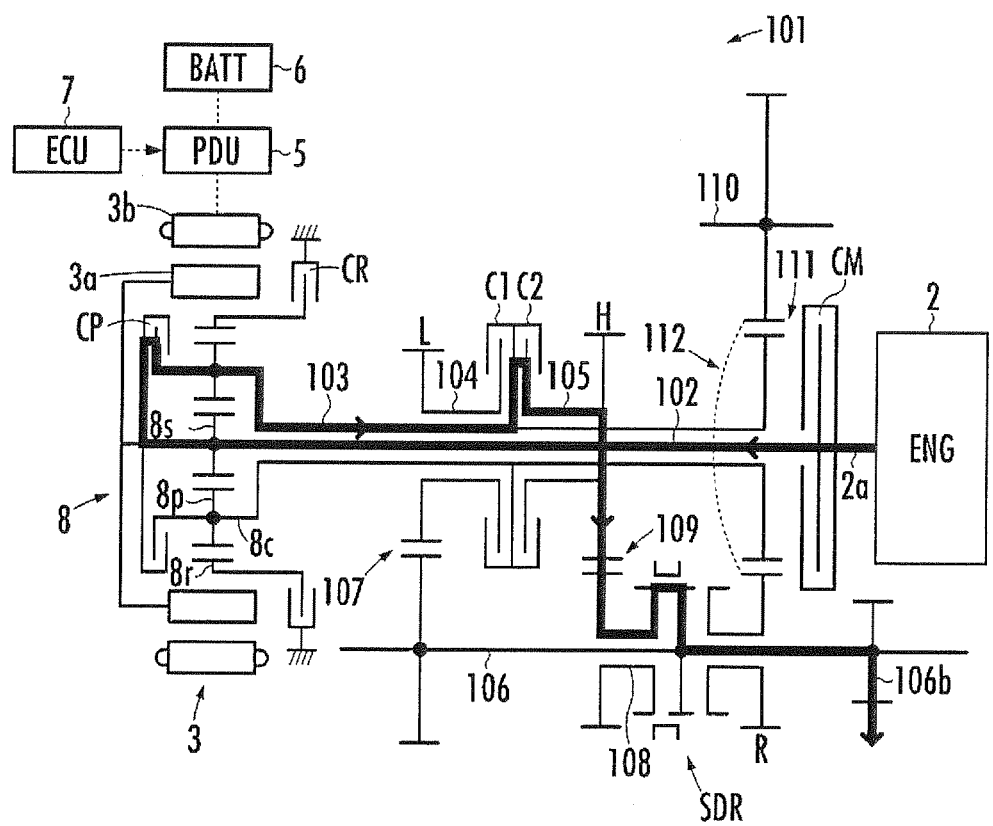
FIG. 28 is a diagram schematically illustrating the power transmission state of the power transmitting device for a hybrid vehicle according to the seventh embodiment at a fourth speed stage in the engine mode.

FIG. 28 illustrates the power transmission state of the power transmitting device 101 at the fourth speed stage in the engine mode. At the fourth speed stage in the engine mode, the ECU 7 sets the main clutch CM, the planetary clutch CP, and the second clutch C2 to the ON state, the ring clutch CR and the first clutch C1 to the OFF state, the synchronizer SDR to the state where the sleeve is moved to the left side in the diagram, the engine 2 to the operation state, and the electric motor 3 to the stopped state.

In this case, the motive power from the output shaft 2a of the engine 2 is input to the sun gear 8s via the main clutch CM and the main input shaft 102. Further, the motive power is output from the carrier 8c, which interlocks with the sun gear 8s, and then transmitted to the driving wheels 4 and 4 via the intermediate input shaft 103, the second clutch C2, the second sub input shaft 105, the high speed gear pair 109, the sub output shaft 108, the output shaft 106, and the like. Thereby, only the motive power of the engine 2 rotates the driving wheels 4 and 4 in the advancing direction of the vehicle in the advancing state at the fourth speed stage. At this time, the sun gear 8s rotates in the forward direction along with the main input shaft 106 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, Fourth Speed Stage]

Figure 29:
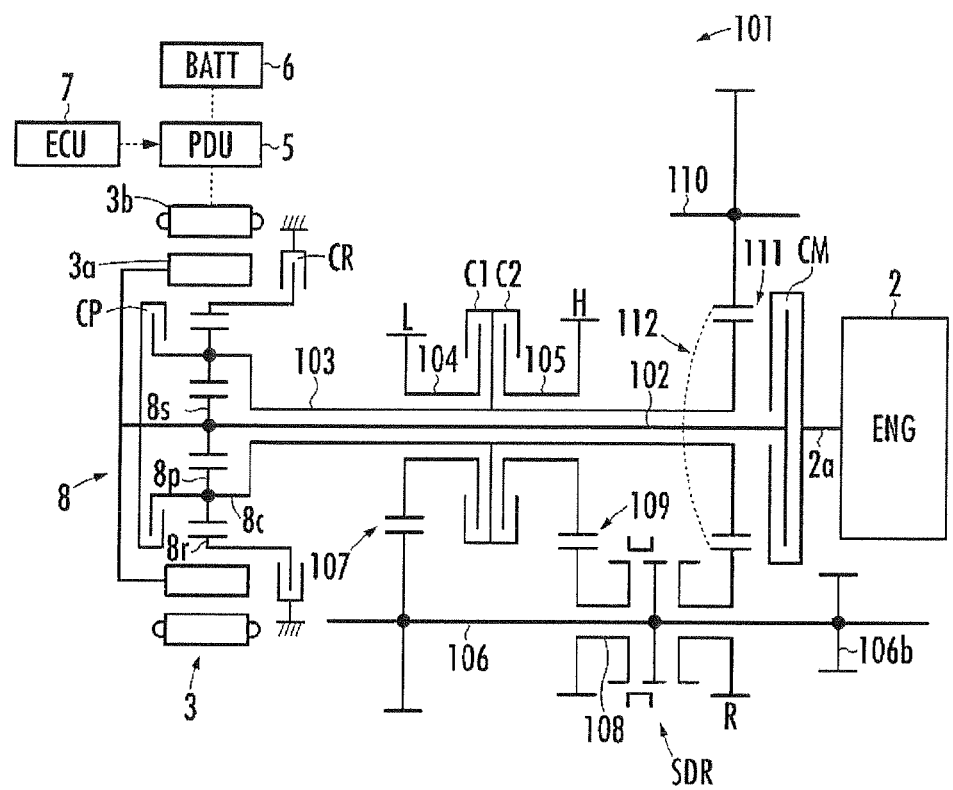
FIG. 29 is a diagram schematically illustrating the power transmission state of the power transmitting device for a hybrid vehicle according to the seventh embodiment at a fourth speed stage in the EV mode.

FIG. 29 illustrates the power transmission state of the power transmitting device 101 at the fourth speed stage in the EV mode. At the fourth speed stage in the EV mode, the ECU 7 sets the planetary clutch CP and the second clutch C2 to the ON state, the main clutch CM, the ring clutch CR, and the first clutch C1 to the OFF state, the synchronizer SDR to the state where the sleeve is moved to the left side in the diagram, the engine 2 to the stopped state, and the electric motor 3 to the operation state where the rotor 3a rotates in the forward direction.

In this case, the motive power from the electric motor 3 is input to the sun gear 8s. Further, the motive power is output from the carrier 8c, which interlocks with the sun gear 8s, and then transmitted to the driving wheels 4 and 4 via the intermediate input shaft 103, the second clutch C2, the second sub input shaft 105, the high speed gear pair 109, the sub output shaft 108, the output shaft 106, and the like. Thereby, only the motive power of the electric motor 3 rotates the driving wheels 4 and 4 in the advancing direction of the vehicle in the advancing state at the fourth speed stage.

[HEV Mode, Fourth Speed Stage]

Figure 30:
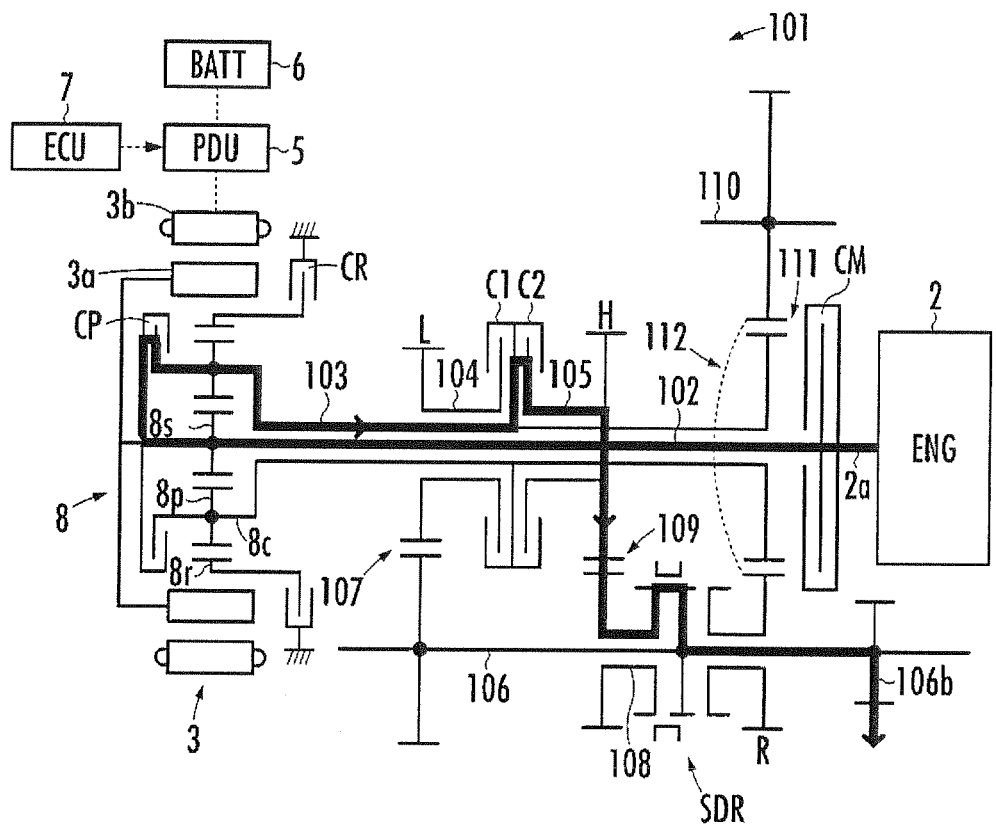
FIG. 30 is a diagram schematically illustrating the power transmission state of the power transmitting device for a hybrid vehicle according to the seventh embodiment at a fourth speed stage in the HEV mode.

FIG. 30 illustrates the power transmission state of the power transmitting device 101 at the fourth speed stage in the HEV mode. At the fourth speed stage in the HEV mode, the ECU 7 sets the main clutch CM, the planetary clutch CP, and the second clutch C2 to the ON state, the ring clutch CR and the first clutch C1 to the OFF state, the synchronizer SDR to the state where the sleeve is moved to the left side in the diagram, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. These motive powers input to the sun gear 8s are output from the carrier 8c, which interlocks with the sun gear 8s, and then transmitted to the driving wheels 4 and 4 via the intermediate input shaft 103, the second clutch C2, the second sub input shaft 105, the high speed gear pair 109, the sub input shaft 108, the output shaft 106, and the like. Thereby, the motive power of the engine 2 and the motive power of the electric motor 3 rotate the driving wheels 4 and 4 in the advancing direction of the vehicle in the advancing state at the fourth speed stage.

[Engine Mode, Reverse Stage]

Figure 31:
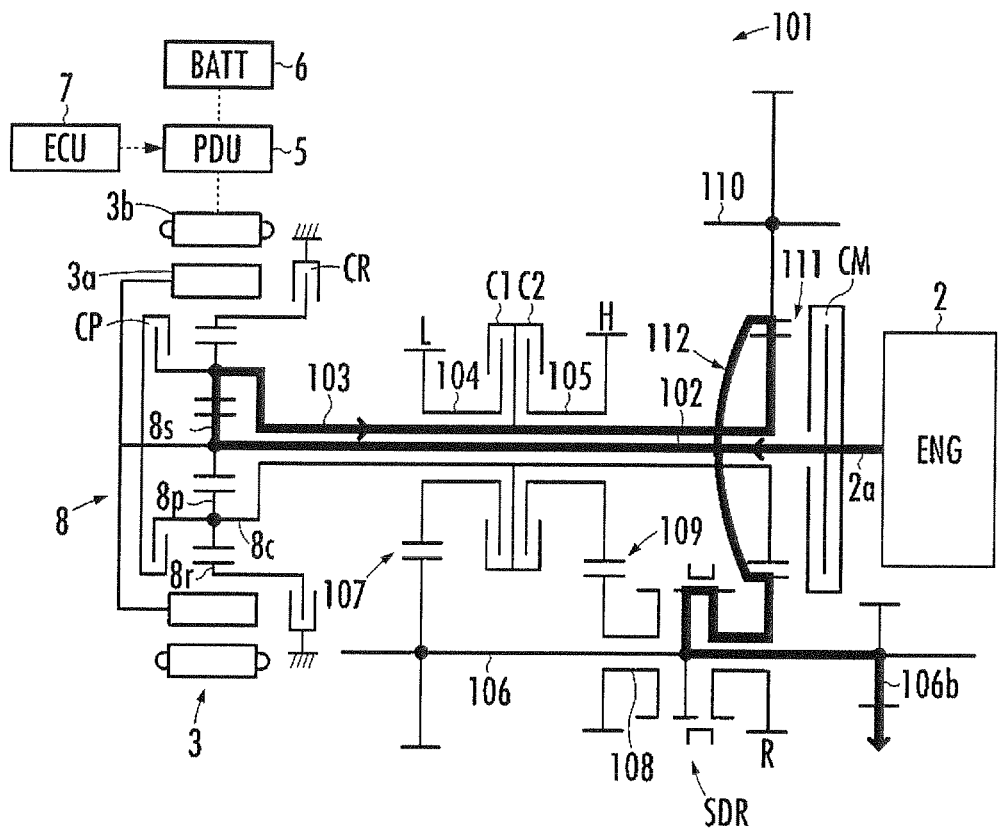
FIG. 31 is a diagram schematically illustrating the power transmission state of the power transmitting device for a hybrid vehicle according to the seventh embodiment at a reverse stage in the engine mode.

FIG. 31 illustrates the power transmission state of the power transmitting device 101 at the reverse stage in the engine mode. At the reverse stage in the engine mode, the ECU 7 sets the main clutch CM, the ring clutch CR to the ON state, the planetary clutch CP, the first clutch C1, and the second clutch C2 to the OFF state, the synchronizer SDR to the state where the sleeve is moved to the right side in the diagram, the engine 2 to the operation state, and the electric motor 3 to the stopped state.

In this case, the motive power from the output shaft 2a of the engine 2 is input to the sun gear 8s via the main clutch CM and the main input shaft 102. Further, the motive power is decelerated by the deceleration mechanism 8 and output from the carrier 8c and then transmitted to the driving wheels 4 and 4 via the intermediate input shaft 103, the pairs of reverse gears 111 and 112, the output shaft 106, and the like. Thereby, only the motive power of the engine 2 rotates the driving wheels 4 and 4 in the backward direction of the vehicle. At this time, the sun gear 8s rotates in the forward direction along with the main input shaft 106 and therefore the rotor 3a rotates in the forward direction. Therefore, the electric motor 3 generates a torque in the direction causing the rotor 3a to rotate in the reverse direction, which enables the regenerative mode in which the electric motor 3 performs the regenerative operation.

[EV Mode, Reverse Stage]

Figure 32:
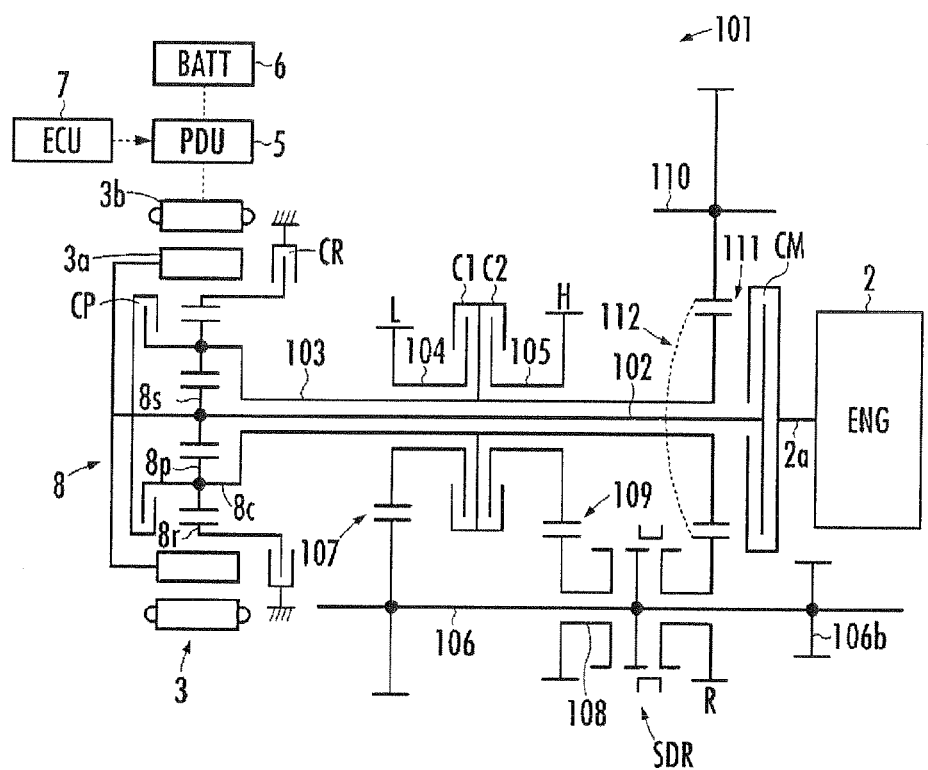
FIG. 32 is a diagram schematically illustrating the power transmission state of the power transmitting device for a hybrid vehicle according to the seventh embodiment at a reverse stage in the EV mode.

FIG. 32 illustrates the power transmission state of the power transmitting device 101 at the reverse stage in the EV mode. At the reverse stage in the EV mode, the ECU 7 sets the ring clutch CR to the ON state, the main clutch CM, the planetary clutch CP, the first clutch C1, and the second clutch C2 to the OFF state, the synchronizer SDR to the state where the sleeve is moved to the left side in the diagram, the engine 2 to the stopped state, and the electric motor 3 to the operation state where the rotor 3a rotates in the forward direction.

In this case, the motive power from the electric motor 3 is input to the sun gear 8s. Further, the motive power is decelerated by the deceleration mechanism 8 and output from the carrier 8c, and then transmitted to the driving wheels 4 and 4 via the intermediate input shaft 103, the pairs of reverse gears 111 and 112, the output shaft 106, and the like. Thereby, only the motive power of the electric motor 3 rotates the driving wheels 4 and 4 in the backward direction of the vehicle.

[HEV Mode, Reverse Stage]

Figure 33:
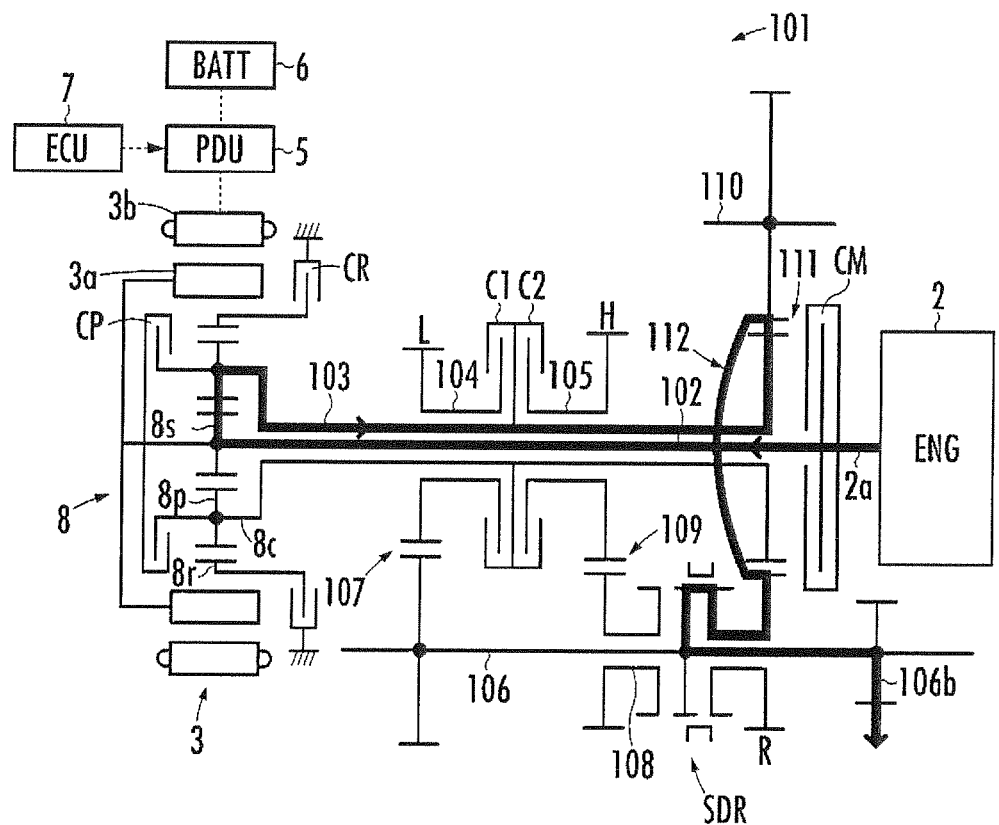
FIG. 33 is a diagram schematically illustrating the power transmission state of the power transmitting device for a hybrid vehicle according to the seventh embodiment at a reverse stage in the HEV mode.

FIG. 33 illustrates the power transmission state of the power transmitting device 101 at the reverse stage in the HEV mode. At the reverse stage in the HEV mode, the ECU 7 sets the main clutch CM and the ring clutch CR to the ON state, the planetary clutch CP, the first clutch C1, and the second clutch C2 to the OFF state, the synchronizer SDR to the state where the sleeve is moved to the left side in the diagram, the engine 2 to the operation state, and the electric motor 3 to the operation state where the rotor 3a rotates in the forward direction.

In this case, the motive power from the output shaft 2a of the engine 2 is transmitted to the sun gear 8s via the main clutch CM and the main input shaft 42. Then, the motive power from the electric motor 3 is also transmitted to the sun gear 8s. These motive powers input to the sun gear 8s are decelerated by the deceleration mechanism 8 and output from the carrier 8c, and then transmitted to the driving wheels 4 and 4 via the intermediate input shaft 103, the pairs of reverse gears 111 and 112, the output shaft 106, and the like. Thereby, the motive power of the engine 2 and the motive power of the electric motor 3 rotate the driving wheels 4 and 4 in the backward direction of the vehicle.

Eighth Embodiment

Figure 34:
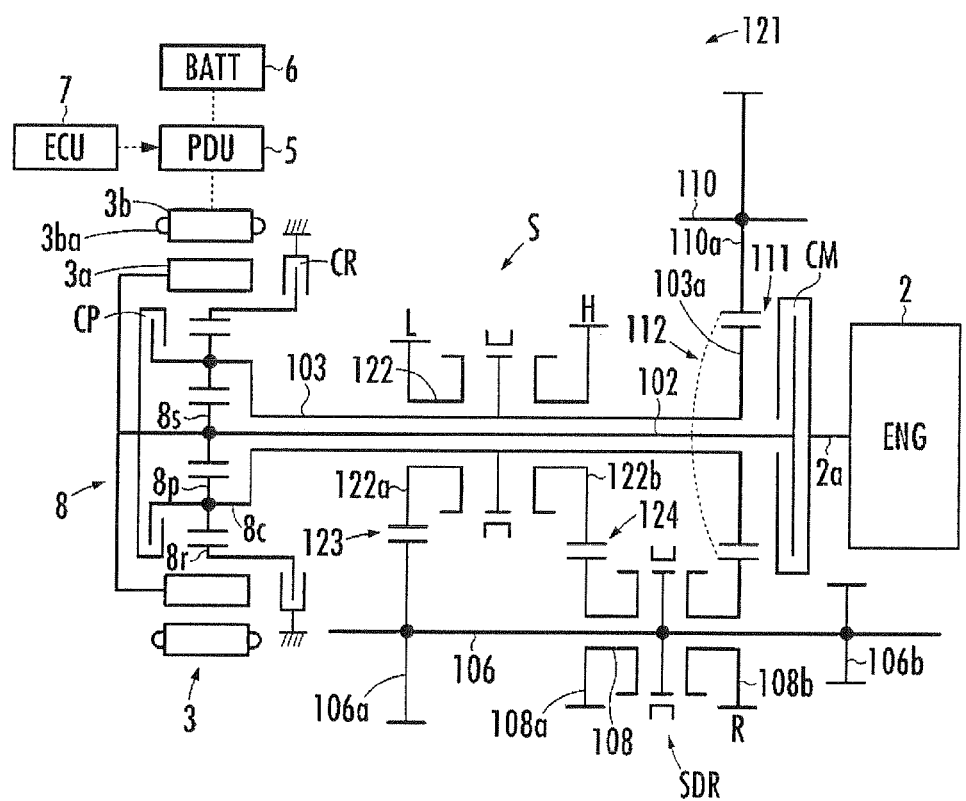
FIG. 34 is a diagram schematically illustrating the general configuration of a vehicle having a power transmitting device for a hybrid vehicle according to an eighth embodiment of the present invention.

A power transmitting device 121 for a hybrid vehicle according to an eighth embodiment of the present invention will be described with reference to FIG. 34. The counter shaft 17 and subsequent constituents are the same as those of FIG. 1 and therefore omitted in FIG. 34.

The power transmitting device 121 is similar to the power transmitting device 101 and therefore only different constituents are described below. The power transmitting device 121 ensures variable speed with four forward speed stages and one backward speed stage in the same manner as for the power transmitting device 101.

The power transmitting device 121 has a synchronizer S, instead of the first and second clutches C1 and C2 of the power transmitting device 101.

A sub input shaft 122 is disposed coaxially with an intermediate input shaft 103. The intermediate input shall 103 and the sub input shaft 122 are connected to each other via the synchronizer S. The synchronizer S is provided in the sub input shaft 122 and is configured so as to be capable of switching between the connection and the disconnection of a low speed gear 122a or a high speed gear 122b and the intermediate input shaft 103.

The synchronizer S is a well-known clutch such as a synchro clutch and selectively connects the low speed gear 122a or the high speed gear 122b to the intermediate input shaft 103 by moving the sleeve in the axial direction of the sub input shaft 122 using an actuator and a shift fork, which are not illustrated. If the sleeve moves to the left side in the diagram, the low speed gear 122a is connected to the intermediate input shaft 103. On the other hand, if the sleeve moves to the right side in the diagram, the high speed gear 122b is connected to the intermediate input shaft 103.

Then, the sub input shaft 122 and the output shaft 106 are connected to each other via a low speed gear pair (a pair of gears) 123. The low speed gear pair 123 is composed of the low speed gear 122a and a low speed gear 106a fixed onto the output shaft 106, which mesh with each other. Further, the sub input shaft 122 and the sub output shaft 108 are connected to each other via a high speed gear pair (a pair of gears) 124. The high speed gear pair 124 is composed of the high speed gear 122b and a high speed gear 108a connected to the sub output shaft 108 via the synchronizer SDR, which mesh with each other.

The operation modes and variable speed stages of the power transmitting device 121 having the above configuration are the same as those of the power transmitting device 101, and therefore the description thereof is omitted here.

The power transmitting device according to the present invention is not limited to the above. For example, the above preferred embodiments may be appropriately combined.

Moreover, in each embodiment, there has been described a case where the low speed gears 12a, 43a, and 104a are disposed in the first sub input shafts 12, 33, 43, and 104 and the high speed gears 13a, 44a, and 105a are disposed in the second sub input shafts 13, 44, and 105, respectively. The high speed gears, however, may be disposed in the first sub input shafts 12, 43, and 104 and the low speed gears may be disposed in the second sub input shafts 13, 44, and 105, respectively.

Further, in the fourth to sixth embodiments, there has been described a case where the odd-numbered stage gears 12a, 13a, 33a, and 33b are disposed in the first sub input shafts 12 and 33 and the second sub input shaft 13, and the even-numbered stage gears 73a, 74a, 83a, and 83b are disposed in the third sub input shafts 73 and 83 and the fourth sub input shaft 74, respectively. The even-numbered stage gears, however, may be disposed in the first sub input shafts 12 and 33 and the second sub input shaft 13, and the odd-numbered stage gears may be disposed in the third sub input shafts 73 and 83 and the fourth sub input shaft 74, respectively.

Moreover, although there has been described a case where the deceleration mechanism 8 is formed of a single-pinion type planetary gear unit, a differential device other than the planetary gear unit may be used for the deceleration mechanism 8. For example, the deceleration mechanism 8 may be formed of a double-pinion type planetary gear unit or an electromagnetic clutch type differential device. Further, there has been described a case where the sun gear 8s is connected to the main input shaft 11, 32, or 102 or the main input shaft 42, the carrier 9c is connected to the sub input shaft 12, 33, or 103 or the first sub input shaft 43, and the ring gear 8r is connected to the brake B or the clutch ring CR. These connections, however, are not limited thereto, but the connections may be modified.

The invention claimed is:

1. A power transmitting device for a hybrid vehicle having an internal combustion engine and an electric motor, the power transmitting device comprising:
an internal combustion engine output shaft to which motive power is input from the internal combustion engine;
a first main input shaft, which is disposed parallel to the internal combustion engine output shaft and selectively connected to the internal combustion engine output shaft by a main make-and-break device;
a first sub input shaft, which is disposed coaxially with the first main input shaft and selectively connected to the first main input shaft by a first make-and-break device;
a second sub input shaft, which is disposed coaxially with the first main input shaft and selectively connected to the first main input shaft by a second make-and-break device;

an output shaft, which is disposed parallel to the first main input shaft and connected to the first sub input shaft and the second sub input shaft, in each case via a respective pair of gears sharing no common gear with each other, and outputs motive power to a driven unit via a counter shaft; and a deceleration mechanism configured so as to be capable of rotating a first rotating element, a second rotating element, and a third rotating element differentially with respect to one another, wherein:

the first sub input shaft and the second sub input shaft are arranged in series along an axial direction of the first main input shaft, and each of the first sub input shaft and the second sub input shaft coaxially encloses the first main input shaft circumferentially;

the first rotating element is connected to the first main input shaft and the electric motor;

the second rotating element is connected to the first sub input shaft;

the third rotating element is connected to a lock mechanism, which is capable of locking the third rotating element to an immovable part; and the second rotating element decelerates motive power transmitted from the first rotating element and motive power transmitted from the third rotating element and transmits the motive powers to the output shaft via the first sub input shaft.

2. The power transmitting device for a hybrid vehicle according to claim 1, wherein the first make-and-break device and the second make-and-break device are wet clutches, which are disposed adjacent to each other in the central axis direction in the first main input shaft.

3. The power transmitting device for a hybrid vehicle according to claim 1, further comprising:

a second main input shaft, which is disposed parallel to the first main input shaft and always connected to the first main input shaft;

a third sub input shaft, which is disposed coaxially with the second main input shaft and selectively connected to the second main input shaft by a third make-and-break device; and a fourth sub input shaft, which is disposed coaxially with the second main input shaft and selectively connected to the second main input shaft by a fourth make-and-break device, wherein a plurality of gears, which are fixed to the output shaft, mesh with gears, which are fixed to the third sub input shaft and the fourth sub input shaft, respectively.

4. The power transmitting device for a hybrid vehicle according to claim 1, further comprising:

an input transmission shaft, which is disposed parallel to the first main input shaft and always connected to the first main input shaft; and a reverse gear, which is selectively connected to the input transmission shaft by a synchronizer, wherein the reverse gear meshes with the gears, which are fixed to the output shaft.

5. The power transmitting device for a hybrid vehicle according to claim 1, further comprising a reverse gear, which is selectively connected to the first sub input shaft by a synchronizer, wherein the reverse gear meshes with the gears, which are fixed to the output shaft.

6. The power transmitting device for a hybrid vehicle according to claim 1, wherein an auxiliary device is connected to the first main input shaft and the auxiliary device is configured so as to be drivable by a driving force of the first main input shaft.

7. The power transmitting device for a hybrid vehicle according to claim 1, wherein:

the deceleration mechanism is a planetary gear unit coaxially having a sun gear, a ring gear, and a carrier, which rotatably supports a plurality of planetary gears meshed with the sun gear and the ring gear therebetween, as three rotating elements; and the first rotating element is the sun gear, the second rotating element is the carrier, and the third rotating element is the ring gear.

8. The power transmitting device for a hybrid vehicle according to claim 1, further comprising:

a requested power setting element, which sets requested power requested for the output shaft; and a control element, which performs the operation of the internal combustion engine and the operation of the electric motor according to the requested power set by the requested power setting element.

9. The power transmitting device for a hybrid vehicle according to claim 8, wherein:

the control element performs the operation of the internal combustion engine within an appropriate operating region of the internal combustion engine; and the control element compares the motive power of the internal combustion engine transmitted from the first rotating element to the second rotating element with the requested power and controls the electric motor to perform a power operation in the case where the motive power of the internal combustion engine is less than the requested power and to perform a regenerative operation in the case where the motive power of the internal combustion engine exceeds the requested power.

10. The power transmitting device for a hybrid vehicle according to claim 1, wherein the control element controls the operation of the electric motor so that the internal combustion engine performs the operation within a range of a stall region to a maximum rpm.

11. The power transmitting device for a hybrid vehicle according to claim 1, wherein the axis of the internal combustion engine output shaft is the same as the axis of the rotating shaft of the electric motor.

12. A power transmitting device for a hybrid vehicle having an internal combustion engine and an electric motor, the power transmitting device comprising:

an internal combustion engine output shaft to which motive power is input from the internal combustion engine;

a first main input shaft, which is disposed parallel to the internal combustion engine output shaft and selectively connected to the internal combustion engine output shaft by a main make-and-break device;

a first sub input shaft, which is disposed coaxially with the first main input shaft;

a first gear group, which is disposed on the first sub input shaft and composed of a plurality of gears selectively connected to the first sub input shaft via a first synchronizer;

an output shaft, which is disposed parallel to the first main input shaft and outputs motive power to a driven unit via a counter shaft;

a second gear group, which is composed of a plurality of gears fixed to the output shaft and mesh with the gears of the first gear group; and a deceleration mechanism, which is configured so as to be capable of rotating a first rotating element, a second rotating element, and a third rotating element differentially with respect to one another, wherein:

the first rotating element is connected to the first main input shaft and the electric motor;

the second rotating element is connected to the first sub input shaft;

the third rotating element is connected to a lock mechanism, which is capable of locking the third rotating element to an immovable part; and the second rotating element decelerates motive power transmitted from the first rotating element and motive power transmitted from the third rotating element and transmits the motive powers to the output shaft via the first sub input shaft.

13. The power transmitting device for a hybrid vehicle according to claim 12, further comprising:

a second main input shaft, which is disposed parallel to the first main input shaft and always connected to the first main input shaft;

a third sub input shaft, which is disposed coaxially with the second main input shaft; and a third gear group, which is disposed on the third sub input shaft and composed of a plurality of gears selectively connected to the third sub input shaft via a second synchronizer, wherein the gears constituting the second gear group mesh with the gears constituting the third gear group.

14. The power transmitting device for a hybrid vehicle according to claim 12, wherein:

the deceleration mechanism is a planetary gear unit coaxially having a sun gear, a ring gear, and a carrier, which rotatably supports a plurality of planetary gears meshed with the sun gear and the ring gear therebetween, as three rotating elements; and the first rotating element is the sun gear, the second rotating element is the carrier, and the third rotating element is the ring gear.

15. A power transmitting device for a hybrid vehicle having an internal combustion engine and an electric motor, the power transmitting device comprising:

an internal combustion engine output shaft to which motive power is input from the internal combustion engine;

a first main input shaft, which is disposed parallel to the internal combustion engine output shaft and selectively connected to the internal combustion engine output shaft by a main make-and-break device;

an intermediate input shaft, which is disposed coaxially with the internal combustion engine output shaft;

a first sub input shaft, which is disposed coaxially with the intermediate input shaft and selectively connected to the intermediate input shaft by a first make-and-break device;

a second sub input shaft, which is disposed coaxially with the intermediate input shaft and selectively connected to the intermediate input shaft by a second make-and-break device;

an output shaft, which is disposed parallel to the first main input shaft and connected to the first sub input shaft and the second sub input shaft, in each case via a respective pair of gears sharing no common gear with each other, and outputs motive power to a driven unit via a counter shaft; and a deceleration mechanism configured so as to be capable of rotating a first rotating element, a second rotating element, and a third rotating element differentially with respect to one another, wherein:

the first sub input shaft and the second sub input shaft are arranged in series along an axial direction of the first main input shaft, and each of the first sub input shaft and the second sub input shaft coaxially encloses the first main input shaft circumferentially;

the first rotating element is connected to the first main input shaft and the electric motor;

the second rotating element is connected to the intermediate input shaft and selectively connected to the first main input shaft by a third make-and-break device;

the third rotating element is connected to a lock mechanism, which is capable of locking the third rotating element to an immovable part; and the second rotating element decelerates motive power transmitted from the first rotating element and motive power transmitted from the third rotating element and transmits the motive powers to the output shaft via the intermediate input shaft.

16. The power transmitting device for a hybrid vehicle according to claim 15, further comprising:

a reverse drive gear fixed onto the intermediate input shaft;

a reverse intermediate gear, which is fixed to a reverse intermediate shaft disposed parallel to the intermediate input shaft and meshes with the reverse drive gear;

a first gear, which is fixed onto the output shaft and meshes with the gear fixed to the first sub input shaft; and a reverse driven gear, which meshes with a second gear, which is disposed on the output shaft and selectively connected to the output shaft via a synchronizer and meshes with a gear fixed to the second sub input shaft, and with the reverse intermediate gear fixed to the reverse intermediate shaft.

17. The power transmitting device for a hybrid vehicle according to claim 15, wherein:

the deceleration mechanism is a planetary gear unit coaxially having a sun gear, a ring gear, and a carrier, which rotatably supports a plurality of planetary gears meshed with the sun gear and the ring gear therebetween, as three rotating elements; and the first rotating element is the sun gear, the second rotating element is the carrier, and the third rotating element is the ring gear.

18. A power transmitting device for a hybrid vehicle having an internal combustion engine and an electric motor, the power transmitting device comprising:

an internal combustion engine output shaft to which motive power is input from the internal combustion engine;

a first main input shaft, which is disposed parallel to the internal combustion engine output shaft and selectively connected to the internal combustion engine output shaft by a main make-and-break device;

an intermediate input shaft, which is disposed coaxially with the internal combustion engine output shaft;

a gear group, which is disposed on the intermediate input shaft and selectively connected to the intermediate input shaft via a synchronizer;

an output shaft, which is disposed parallel to the first main input shaft and outputs motive power to a driven unit via a counter shaft;

a second gear group, which is composed of a plurality of gears connected to the output shaft and meshes with the gears of the first gear group; and a deceleration mechanism configured so as to be capable of rotating a first rotating element, a second rotating element, and a third rotating element differentially with respect to one another, wherein:
the first rotating element is connected to the first main input shaft and the electric motor;
the second rotating element is connected to the intermediate input shaft and selectively connected to the first main input shaft by a secondary make-and-break device;
the third rotating element is connected to a lock mechanism, which is capable of locking the third rotating element to an immovable part; and
the second rotating element decelerates motive power transmitted from the first rotating element and motive power transmitted from the third rotating element and transmits the motive powers to the output shaft via the intermediate input shaft.

19. The power transmitting device for a hybrid vehicle according to claim 18, further comprising:
a reverse drive gear fixed onto the intermediate input shaft;
a reverse intermediate gear, which is fixed to a reverse intermediate shaft disposed parallel to the intermediate input shaft and meshes with the reverse drive gear;
a first driven gear, which is fixed onto the output shaft and meshes with a first drive gear constituting the first gear group; and
a reverse driven gear, which meshes with a second driven gear, which is disposed on the output shaft and selectively connected to the output shaft via a synchronizer and constitutes the first gear group, and with the reverse intermediate gear,
wherein the second gear group includes the first driven gear and the second driven gear.

20. The power transmitting device for a hybrid vehicle according to claim 18, wherein:
the deceleration mechanism is a planetary gear unit coaxially having a sun gear, a ring gear, and a carrier, which rotatably supports a plurality of planetary gears meshed with the sun gear and the ring gear therebetween, as three rotating elements; and
the first rotating element is the sun gear, the second rotating element is the carrier, and the third rotating element is the ring gear.

* * * * *